United States Patent
Kim et al.

(10) Patent No.: US 11,930,973 B2
(45) Date of Patent: Mar. 19, 2024

(54) CLEANER

(71) Applicant: LG ELECTRONICS INC., Seoul (KR)

(72) Inventors: Jeongyun Kim, Seoul (KR); Jaewon Jang, Seoul (KR); Inhyung Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/079,574

(22) Filed: Dec. 12, 2022

(65) Prior Publication Data

US 2023/0111570 A1 Apr. 13, 2023

Related U.S. Application Data

(63) Continuation of application No. 17/526,392, filed on Nov. 15, 2021, which is a continuation of application
(Continued)

(51) Int. Cl.
*A47L 11/283* (2006.01)
*A47L 9/00* (2006.01)
(Continued)

(52) U.S. Cl.
CPC ............. *A47L 11/283* (2013.01); *A47L 9/009* (2013.01); *A47L 9/0606* (2013.01);
(Continued)

(58) Field of Classification Search
CPC ...... A47L 11/16; A47L 11/161; A47L 11/185; A47L 11/20; A47L 11/201; A47L 11/282;
(Continued)

(56) References Cited

U.S. PATENT DOCUMENTS 3,381,334 A 5/1968 Redmond
3,793,665 A 2/1974 Thielen
(Continued)

FOREIGN PATENT DOCUMENTS

CN 1568156 A 1/2005
CN 1823677 A 8/2006
(Continued)

OTHER PUBLICATIONS

Australian Office Action dated Jul. 16, 2019, on Australian Patent appl. No. 2017297104 (5 Pages).
(Continued)

*Primary Examiner* — Randall E Chin
(74) *Attorney, Agent, or Firm* — Birch, Stewart, Kolasch & Birch, LLP

(57) ABSTRACT

A cleaner includes a body, a left spin-mop module and a right spin-mop module configured to perform mopping, and a water supply module configured to supply water to the left spin-mop module and the right spin-mop module. The water supply module includes a water tank to store water therein, a pump to pressurize the water in the water tank to move the water to the left spin-mop module and the right spin-mop module, a first supply pipe connecting the water tank and the pump, a common pipe connected to the pump, the common pump configured to guide movement of the pressurized water from the pump, a first branch pipe configured to guide a first portion of the water in the common pipe to the left spin-mop module, and a second branch pipe configured to guide a second portion of the water in the common pipe to the right spin-mop module.

28 Claims, 25 Drawing Sheets

Related U.S. Application Data

No. 16/333,131, filed as application No. PCT/KR2017/007551 on Jul. 14, 2017, now Pat. No. 11,564,546.

(60) Provisional application No. 62/362,358, filed on Jul. 14, 2016.

(51) Int. Cl.
| | |
|---|---|
| *A47L 9/06* | (2006.01) |
| *A47L 9/28* | (2006.01) |
| *A47L 11/14* | (2006.01) |
| *A47L 11/16* | (2006.01) |
| *A47L 11/20* | (2006.01) |
| *A47L 11/24* | (2006.01) |
| *A47L 11/282* | (2006.01) |
| *A47L 11/292* | (2006.01) |
| *A47L 11/293* | (2006.01) |
| *A47L 11/34* | (2006.01) |
| *A47L 11/40* | (2006.01) |
| *A47L 13/20* | (2006.01) |
| *A47L 13/50* | (2006.01) |
| *B08B 1/04* | (2006.01) |
| *B08B 3/04* | (2006.01) |
| *B08B 3/08* | (2006.01) |
| *B25J 5/00* | (2006.01) |
| *B25J 9/00* | (2006.01) |
| *B25J 9/12* | (2006.01) |
| *B25J 9/16* | (2006.01) |
| *B25J 11/00* | (2006.01) |
| *G05D 1/00* | (2006.01) |
| *A47L 11/00* | (2006.01) |

(52) U.S. Cl.
CPC ........... *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01); *A47L 11/40* (2013.01); *A47L 11/4002* (2013.01); *A47L 11/4005* (2013.01); *A47L 11/4011* (2013.01); *A47L 11/4013* (2013.01); *A47L 11/4038* (2013.01); *A47L 11/4041* (2013.01); *A47L 11/405* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/408* (2013.01); *A47L 11/4083* (2013.01); *A47L 11/4088* (2013.01); *A47L 13/20* (2013.01); *A47L 13/50* (2013.01); *B08B 1/04* (2013.01); *B08B 3/041* (2013.01); *B08B 3/08* (2013.01); *B25J 5/007* (2013.01); *B25J 9/0003* (2013.01); *B25J 9/126* (2013.01); *B25J 9/1664* (2013.01); *B25J 9/1666* (2013.01); *B25J 11/0085* (2013.01); *G05D 1/0223* (2013.01); *A47L 11/00* (2013.01); *A47L 11/145* (2013.01); *A47L 2201/00* (2013.01); *A47L 2201/04* (2013.01); *A47L 2201/06* (2013.01); *B08B 2203/00* (2013.01); *G05D 2201/0203* (2013.01)

(58) Field of Classification Search
CPC ...... A47L 11/283; A47L 11/40; A47L 11/405; A47L 11/408; A47L 11/4038; A47L 11/4041; A47L 11/4061; A47L 11/4066; A47L 11/4069; A47L 11/4083; A47L 11/4088; A47L 2201/00; A47L 2201/06; B25J 11/0085
See application file for complete search history.

(56) References Cited

U.S. PATENT DOCUMENTS

| | | |
|---|---|---|
| 3,795,932 A | 3/1974 | Young |
| 3,827,099 A | 8/1974 | Allaire et al. |
| 4,418,342 A | 11/1983 | Aschoff et al. |
| 5,249,325 A | 10/1993 | Wilen |
| 5,991,951 A | 11/1999 | Kubo et al. |
| 6,493,896 B1 | 12/2002 | Stuchlik et al. |
| 7,320,149 B1 | 1/2008 | Huffman et al. |
| 9,357,894 B2 | 6/2016 | Chiu et al. |
| 9,560,947 B2 | 2/2017 | Park et al. |
| 9,814,364 B1 | 11/2017 | Caruso |
| 10,111,570 B2 | 10/2018 | Scholten et al. |
| 2004/0163199 A1 | 8/2004 | Hsu |
| 2004/0221474 A1 | 11/2004 | Slutsky et al. |
| 2005/0015913 A1 | 1/2005 | Kim et al. |
| 2005/0166356 A1 | 8/2005 | Uehigashi |
| 2005/0183230 A1 | 8/2005 | Uehigashi |
| 2006/0185690 A1 | 8/2006 | Song et al. |
| 2007/0261715 A1 | 11/2007 | Lee et al. |
| 2008/0282490 A1 | 11/2008 | Oh |
| 2009/0281661 A1 | 11/2009 | Dooley et al. |
| 2010/0031463 A1 | 2/2010 | Adams et al. |
| 2011/0202175 A1 | 8/2011 | Romanov et al. |
| 2012/0084938 A1 | 4/2012 | Fu |
| 2012/0125363 A1 | 5/2012 | Kim et al. |
| 2013/0096717 A1 | 4/2013 | Yoon et al. |
| 2013/0263889 A1 | 10/2013 | Yoon et al. |
| 2014/0130289 A1 | 5/2014 | Hyun et al. |
| 2014/0209122 A1 | 7/2014 | Jung et al. |
| 2015/0142169 A1 | 5/2015 | Kim et al. |
| 2015/0143646 A1 | 5/2015 | Jeong et al. |
| 2015/0150429 A1 | 6/2015 | Yoo et al. |
| 2015/0182090 A1 | 7/2015 | Park et al. |
| 2015/0196183 A1 | 7/2015 | Clark et al. |
| 2015/0342431 A1 | 12/2015 | Zydek |
| 2016/0022109 A1 | 1/2016 | Dooley et al. |
| 2016/0051108 A1 | 2/2016 | Huang et al. |
| 2016/0296092 A1 | 10/2016 | Wolfe et al. |
| 2018/0120833 A1 | 5/2018 | Lindhé et al. |
| 2019/0270124 A1 | 9/2019 | Jang et al. |

FOREIGN PATENT DOCUMENTS

| | | |
|---|---|---|
| CN | 2817718 Y | 9/2006 |
| CN | 1721815 A | 1/2008 |
| CN | 101267759 A | 9/2008 |
| CN | 101305893 A | 11/2008 |
| CN | 101313829 B | 4/2012 |
| CN | 202341952 U | 7/2012 |
| CN | 102652654 A | 9/2012 |
| CN | 102934968 A | 2/2013 |
| CN | 103006153 A | 4/2013 |
| CN | 203113255 U | 8/2013 |
| CN | 203296009 U | 11/2013 |
| CN | 103418127 A | 12/2013 |
| CN | 203314896 U | 12/2013 |
| CN | 103717117 A | 4/2014 |
| CN | 203763007 U | 8/2014 |
| CN | 104068799 A | * 10/2014 |
| CN | 203947323 U | 11/2014 |
| CN | 104244794 A | 12/2014 |
| CN | 203987872 U | 12/2014 |
| CN | 104337469 A | 2/2015 |
| CN | 104757906 A | 7/2015 |
| CN | 104918529 A | 9/2015 |
| CN | 105744874 A | 7/2016 |
| CN | 205411088 U | 8/2016 |
| EP | 0 879 009 A1 | 11/1998 |
| EP | 1 695 652 A1 | 8/2006 |
| EP | 2 702 918 A1 | 3/2014 |

(56) References Cited

FOREIGN PATENT DOCUMENTS

| | | |
|---|---|---|
| EP | 2 756 787 A1 | 7/2014 |
| EP | 2 762 051 A2 | 8/2014 |
| EP | 2 875 768 A1 | 5/2015 |
| EP | 3 485 785 A1 | 5/2019 |
| JP | 3-123522 A | 5/1991 |
| JP | 5-300860 A | 11/1993 |
| JP | 11-178764 A | 7/1999 |
| JP | 2000-51128 A | 2/2000 |
| JP | 2000-70203 A | 3/2000 |
| JP | 2001-299656 A | 10/2001 |
| JP | 2002-51836 A | 2/2002 |
| JP | 2005-6816 A | 1/2005 |
| JP | 2009-56216 A | 3/2009 |
| JP | 2014-45898 A | 3/2014 |
| KR | 20-0195057 Y1 | 9/2000 |
| KR | 2002-0074985 A | 10/2002 |
| KR | 10-2005-0012047 A | 1/2005 |
| KR | 10-2005-0014652 A | 2/2005 |
| KR | 20-0412179 Y1 | 3/2006 |
| KR | 20-0413777 Y1 | 4/2006 |
| KR | 10-2006-0094374 A | 8/2006 |
| KR | 10-0669889 B1 | 1/2007 |
| KR | 20-0435111 Y1 | 1/2007 |
| KR | 10-0822785 B1 | 4/2008 |
| KR | 10-0864697 B1 * | 10/2008 |
| KR | 10-2009-0026031 A | 3/2009 |
| KR | 10-2009-0086657 A | 8/2009 |
| KR | 10-2009-0119638 A | 11/2009 |
| KR | 10-2010-0006151 A | 1/2010 |
| KR | 20-2010-0001717 U | 2/2010 |
| KR | 10-0982121 B1 | 6/2010 |
| KR | 10-0985376 B1 | 10/2010 |
| KR | 10-2010-0133870 A | 12/2010 |
| KR | 10-1000178 B1 | 12/2010 |
| KR | 10-2011-0105305 A | 9/2011 |
| KR | 10-1073102 B1 | 11/2011 |
| KR | 20-0458863 Y1 | 3/2012 |
| KR | 20-2012-0002399 U | 4/2012 |
| KR | 10-2012-0042391 A | 5/2012 |
| KR | 10-2012-0055891 A | 6/2012 |
| KR | 10-2012-0100682 A | 9/2012 |
| KR | 10-2013-0042423 A | 4/2013 |
| KR | 10-1303159 B1 | 9/2013 |
| KR | 10-2013-0129059 A | 11/2013 |
| KR | 10-2014-0022472 A | 2/2014 |
| KR | 10-2014-0093369 A | 7/2014 |
| KR | 10-2015-0014351 A | 2/2015 |
| KR | 10-2015-0022133 A | 3/2015 |
| KR | 10-2015-0031821 A | 3/2015 |
| KR | 10-2015-0048490 A | 5/2015 |
| KR | 10-2015-0057959 A | 5/2015 |
| KR | 10-1522177 B1 | 5/2015 |
| KR | 10-2015-0060030 A | 6/2015 |
| KR | 10-2015-0078094 A | 7/2015 |
| KR | 10-2015-0107396 A | 9/2015 |
| KR | 10-2015-0107693 A | 9/2015 |
| KR | 10-2015-0116311 A | 10/2015 |
| KR | 10-1569058 B1 | 11/2015 |
| KR | 10-2015-0139111 A | 12/2015 |
| KR | 10-1578887 B1 | 12/2015 |
| KR | 10-1595727 B1 | 2/2016 |
| KR | 10-2016-0033615 A | 3/2016 |
| KR | 10-1613446 B1 | 4/2016 |
| KR | 10-2016-0090570 A | 8/2016 |
| KR | 10-2018-0104429 A | 9/2016 |
| KR | 10-2016-0122520 A | 10/2016 |
| KR | 10-1678443 B1 | 12/2016 |
| KR | 10-2018-0105109 A | 9/2018 |
| TW | 537326 U | 6/2003 |
| TW | M455464 U | 6/2013 |
| WO | WO 97/28731 A1 | 6/1997 |
| WO | WO 2015/186944 A1 | 12/2015 |
| WO | WO 2016/027957 A1 | 2/2016 |
| WO | WO 2016/036183 A1 | 3/2016 |

OTHER PUBLICATIONS

Chinese Office Action dated Aug. 12, 2020, on Chinese Patent Application No. 201780056687.2 (5 Pages).
Chinese Office Action dated Aug. 3, 2020, on Chinese Patent Application No. 201780056675.X (7 Pages).
Chinese Office Action dated Jul. 22, 2020, on Chinese Patent Application No. 201780056575.7 (11 Pages).
Chinese Office Action dated Sep. 21, 2020 on Chinese Patent Application No. 201780056578.0 (8 Pages).
European Search Report dated Apr. 2, 2020, on European Patent Application No. 17827992.3 (8 Pages).
European Search Report dated Aug. 13, 2020, on European Patent Application No. 17827983.2 (12 Pages).
European Search Report dated Aug. 14, 2020, on European Patent Application No. 17827987.3 (7 Pages).
European Search Report dated Mar. 31, 2020, on European Patent Application No. 17827982.4 (7 Pages).
European Search Report dated May 26, 2020, on European Patent Application No. 17827985.7 (7 Pages).
European Search Report dated May 26, 2020, on European Patent Application No. 17827993.1 (7 Pages).
European Search Report dated May 4, 2020, on European Patent Application No. 17827984.0 (7 Pages).
Korean Notice of Allowance date Apr. 29, 2020, on Korean Patent Application No. 10-2018-7036039 (2 Pages).
Korean Notice of Allowance dated Apr. 28, 2020, on Korean Patent Application No. 10-2018-7036042 (2 Pages).
Korean Notice of Allowance dated Jul. 1, 2020, on Korean Patent Application No. 10-2018-7036041 (2 Pages).
Korean Notice of Allowance dated Jun. 29, 2018, Korean Patent appl. No. 10-2017-0009364 (2 Pages).
Korean Notice of Allowance of Allowance dated Jun. 17, 2019, on Korean Patent appl. No. 10-2018-0110855 (2 Pages).
Korean Office Action dated Apr. 23, 2020, on Korean Patent Application No. 10-2018-7036043 (6 Pages).
Korean Office Action dated Aug. 19, 2020, on Korean Patent Application No. 10-2020-704910 (7 Pages).
PCT Search Report dated Nov. 20, 2017, on PCT International Patent appl. No. PCT/KR2017/007550 (3 Pages).
PCT Search Report dated Nov. 20, 2017, on PCT International Patent appl. No. PCT/KR2017/007551 (3 Pages).
PCT Search Report dated Nov. 20, 2017, on PCT International Patent appl. No. PCT/KR2017/007552 (3 Pages).
PCT Search Report dated Nov. 20, 2017, on PCT International Patent appl. No. PCT/KR2017/007555 (3 Pages).
PCT Search Report dated Nov. 20, 2017, on PCT International Patent appl. No. PCT/KR2017/007562 (3 Pages).
PCT Search Report dated Nov. 23, 2017, on PCT International Patent appl. No. PCT/KR2017/007557 (3 Pages).
PCT Search Report dated Nov. 23, 2017, on PCT International Patent appl. No. PCT/KR2017/007560 (3 Pages).
PCT Search Report dated Nov. 23, 2017, on PCT International Patent appl. No. PCT/KR2017/007561 (3 Pages).
PCT Search Report dated Sep. 28, 2017, on PCT International Patent appl. No. PCT/KR2017/007549 (3 Pages).
Taiwan Office Action dated Dec. 18, 2018, on Taiwan Patent Application No. 107101303 (8 Pages).
Taiwan Office Action dated Dec. 24, 2018, on Taiwan Patent Application No. 107101298 (11 Pages).
Taiwan Office Action dated Dec. 25, 2018, on Taiwan Patent Application No. 107101297 (10 Pages).
Taiwan Office Action dated May 22, 2020, on Taiwan Patent Application No. 107101298 (11 Pages).
Taiwan Office Action dated Oct. 30, 2018, on Taiwan Patent Application No. 107101299 (8 Pages).
Taiwan Office Action dated Sep. 18, 2019, on Taiwan Patent appl. No. 107101298 (4 Pages).
U.S. Office Action dated Jan. 28, 2021 on U.S. Appl. No. 16/333,147 (19 Pages).
U.S. Office Action dated Jul. 15, 2020, on U.S. Appl. No. 16/333,129 (20 Pages).

(56) References Cited

OTHER PUBLICATIONS

U.S. Office Action dated May 22, 2020, on U.S. Appl. No. 16/333,098 (9 Pages).
U.S. Office Action dated May 6, 2020, on U.S. Appl. No. 16/333,144 (8 Pages).
U.S. Office Action dated Oct. 6, 2020 on U.S. Appl. No. 16/333,124 (32 Pages).
U.S. Office Action dated Oct. 9, 2020 on U.S. Appl. No. 16/333,135 (70 Pages).
U.S. Office Action dated Sep. 21, 2020 on U.S. Appl. No. 16/333,138 (21 Pages).

* cited by examiner

FIG. 8
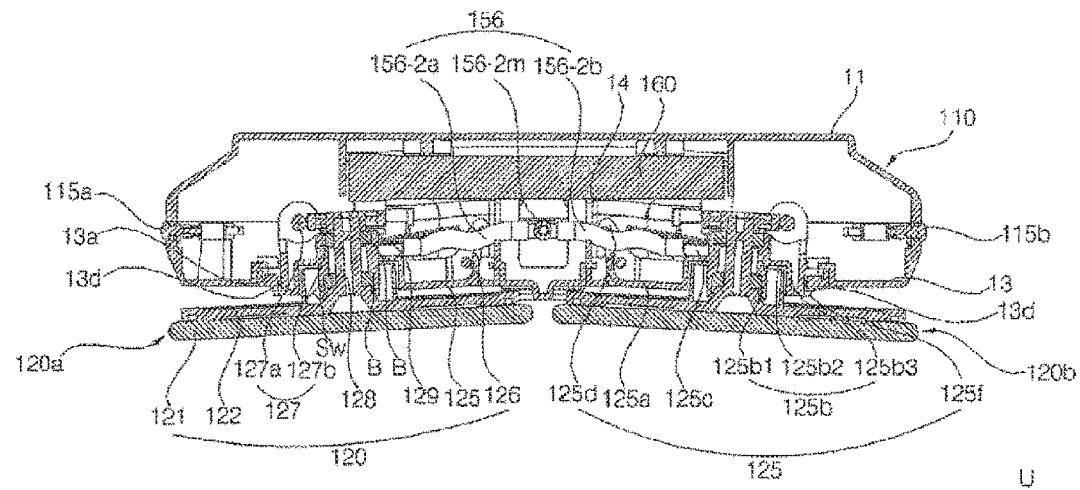
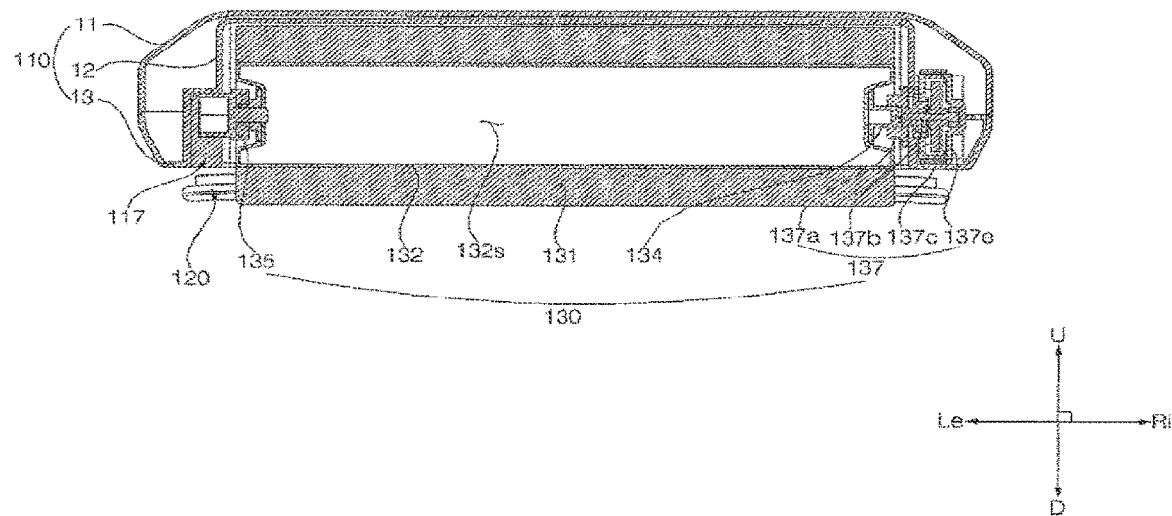
FIG. 9

CLEANER

CROSS-REFERENCE TO RELATED APPLICATIONS

This application is a continuation of U.S. application Ser. No. 17/526,392, filed on Nov. 15, 2021, now pending, which is a continuation of U.S. application Ser. No. 16/333,131, filed on Dec. 19, 2019, now U.S. Pat. No. 11,564,546, which is U.S. National Phase entry under 35 U.S.C. § 371 from PCT International Application No. PCT/KR2017/007551, filed Jul. 14, 2017, which claims the benefit of priority of U.S. Provisional Application No. 62/362,358, filed Jul. 14, 2016, the contents of all of which are incorporated herein by reference in their entireties.

BACKGROUND OF THE INVENTION

Field of the Invention

The present invention relates to a cleaner that performs mopping.

Description of Related Art

A cleaner is a device that performs cleaning by suctioning dirt such as dust from the floor or mopping dirt on the floor. Recently, a cleaner capable of performing mopping has been developed. In addition, a robot cleaner is a device that performs cleaning autonomously via self-driving.

There has been known a robot cleaner capable of moving using a mop surface as the prior art (Korean Registered Patent No. 10-1602790).
1. Korean Registered Patent No. 10-1602790 (Registered Date: Mar. 7, 2016)

Technical Problem

A first object of the present invention is to increase frictional force between a mop and a floor surface so that a cleaner performs a mopping operation and travels effectively.

The aforementioned robot cleaner of the prior art is supported by a pair of left and right mops in a two-point support manner, and thus has a problem in that stability in the forward-and-backward direction is deteriorated. A second object of the present invention is to solve this problem, thereby improving the stability of the robot cleaner in the leftward-and-rightward direction and in the forward-and-backward direction.

The aforementioned robot cleaner of the prior art moves via rotation of a pair of left and right mops. However, the frictional force that is generated by rotation of the pair of mops varies frequently, and it is therefore difficult for the robot cleaner of the prior art to travel straight. If the robot cleaner cannot travel straight, an area that is not wiped by the robot cleaner increases in a floor surface on which the robot cleaner needs to travel straight, e.g. a floor surface near a wall. A third object of the present invention is to solve this problem.

The aforementioned robot cleaner of the prior art, which moves via rotation of a pair of left and right mops, has limitations pertaining to a traveling speed and a traveling route. A fourth object of the present invention is to solve this problem, thereby enabling the robot cleaner to realize various traveling speeds and traveling routes.

The aforementioned robot cleaner of the prior art, which moves via rotation of a pair of left and right mops, has a problem in that it is difficult to perform a mopping operation without rotating in place or moving linearly. A fifth object of the present invention is to solve this problem, thereby enabling the robot cleaner to perform a mopping operation even when the robot cleaner stays in place without rotating.

A sixth object of the present invention is to efficiently remove moisture that is left on a floor surface after a wet mopping operation.

A seventh object of the present invention is to provide a cleaner that performs mopping and sterilization at the same time.

An eighth object of the present invention is to provide a device that is capable of performing a wet mopping operation and a dry cleaning operation (dry mopping, vacuum cleaning, and/or sweeping using brushes) in combination, thereby performing a thorough and efficient mopping operation.

Technical Solution

In accordance with the present invention, the above and other objects can be accomplished by the provision of a cleaner including a first cleaning module including a left spin mop and a right spin mop provided so as to come into contact with a floor while rotating in a clockwise direction or in a counterclockwise direction when viewed from the upper side, a second cleaning module configured so as to come into contact with the floor at a position spaced apart from the left spin mop and the right spin mop in a forward-and-backward direction, a body supported by the first cleaning module and the second cleaning module, and a water supply module configured to supply water to the first cleaning module and including a water tank disposed inside the body.

The body may move via rotation of the left spin mop and the right spin mop without a separate driving wheel.

The second cleaning module may include a rolling member configured to rotate about a rotation axis extending in the horizontal direction.

The body may move via rotation of at least one of the left spin mop, the right spin mop, or the rolling member without a separate driving wheel.

Water supplied by the water supply module may reach the first cleaning module before reaching the floor.

The direction in which the rolling member rotates may be changeable.

When the first cleaning module performs a predetermined constant rotation operation, the rolling member may perform two or more different rotation operations.

The second cleaning module may include a mop unit or a brush, a rotary member for fixing the mop unit or the brush, a first shaft member for connecting one end portion of the rotary member and the body to each other, a second shaft member for connecting the opposite end portion of the rotary member and the body to each other, and a rolling drive unit for providing drive force for rotating the rolling member.

The rolling member may rotate about a rotation axis extending in the leftward-and-rightward direction.

The rolling member may include any one of a mop unit for mopping the floor and a brush for sweeping the floor.

The first cleaning module may include a left rotating plate for fixing a mop unit of the left spin mop, a left spin shaft fixed to the left rotating plate to rotate the left rotating plate, a left spin-drive unit for providing power required for rotating the left spin shaft, a right rotating plate for fixing a mop unit of the right spin mop, a right spin shaft fixed to the right rotating plate to rotate the right rotating plate, and a right spin-drive unit for providing power required for rotating the right spin shaft.

The point on the bottom surface of the left spin mop that receives largest frictional force from the floor may be located to the left of the rotation center of the left spin mop, and the point on the bottom surface of the right spin mop that receives largest frictional force from the floor may be located to the right of the rotation center of the right spin mop.

The second cleaning module may include a rolling member including a mop unit configured to rotate about a rotation axis extending in the leftward-and-rightward direction. The contact area between the rolling member and the floor may overlap the entire area of the gap between the rotation center of the left spin mop and the rotation center of the right spin mop when viewed from the front side.

The water supply module may supply water to the first cleaning module without supplying water to the second cleaning module. Each of the first cleaning module and the second cleaning module may be configured to mop the floor.

The water tank may be disposed such that the center of gravity of the water tank is located closer to a portion of the first cleaning module that contacts the floor than to a portion of the second cleaning module that contacts the floor in the forward-and-backward direction.

The cleaner may further include a battery for supplying power. The battery may be disposed such that the center of gravity of the battery is located closer to a portion of the first cleaning module that contacts the floor than to a portion of the second cleaning module that contacts the floor in the forward-and-backward direction.

The cleaner may further include an ultraviolet (UV) light-emitting diode configured to emit UV rays downwards and disposed between the first cleaning module and the second cleaning module.

The cleaner may further include a sterilized-water-generating module configured to generate sterilized water via electrolysis of water inside the water tank.

The cleaner may further include a sensing module including at least one of a bumper for sensing contact with an external obstacle, an obstacle sensor for sensing an external obstacle that is spaced apart from the cleaner, or a cliff sensor for sensing presence or absence of a cliff on a traveling surface, and a controller configured to receive a sensing signal from the sensing module and to control autonomous travel of the cleaner.

Advantageous Effects

The cleaner is supported by the first cleaning module and the second cleaning module, thereby enhancing mopping efficiency.

In addition, the stability of the cleaner in the leftward-and-rightward direction may be ensured by the left spin mop and the right spin mop, which are arranged in the leftward-and-rightward direction, and the stability of the cleaner is also improved by the second cleaning module, which is disposed behind the first cleaning module and is brought into contact with the floor.

Specifically, on the basis of the support point of the first cleaning module, the second cleaning module prevents the cleaner from overturning in the backward direction, and the mop surface of the first cleaning module prevents the cleaner from overturning in the forward direction.

In addition, since wobbling of the cleaner in the leftward-and-rightward direction is minimized by the frictional force provided by the second cleaning module, the cleaner is capable of traveling straight while being moved by the frictional force of the mop surface.

In addition, through the provision of the water tank disposed inside the body, the body transmits a relatively large load to the first cleaning module, thereby performing more effective mopping.

In addition, through the provision of the water supply module for supplying water to the first cleaning module, the cleaner is capable of performing wet mopping without requiring the user to supply water to the mop.

In addition, through the provision of the rolling member that rotates about a rotation axis extending in the horizontal direction, additional moving force may be efficiently applied to the body via rotation of the rolling member. Accordingly, it is possible to realize various types of traveling motion (traveling route and traveling speed) of the cleaner.

In addition, through the provision of the rolling member that rotates about a rotation axis extending in the leftward-and-rightward direction, moving force may be additionally applied to the body in the forward-and-backward direction via rotation of the rolling member. Accordingly, it is possible to realize various and efficient traveling motion of the cleaner.

When the first cleaning module performs a predetermined constant rotation operation, the rolling member is capable of performing two or more different rotation operations. Accordingly, it is possible to realize various traveling routes and traveling speeds of the cleaner.

In addition, since the rotating direction of the rolling member can be changed, it is possible to combine one of two types of frictional force generated in two directions by the rolling member with the frictional force generated by the first cleaning module. Accordingly, the cleaner is capable of performing various operations. Specifically, the allowable maximum speed of the cleaner in the forward-and-backward direction may be further increased. In addition, the cleaner is capable of turning to the right or to the left with various turning radii. In addition, the cleaner is capable of turning to the right or to the left while moving backward, and is capable of performing mopping via rotation while the body stays in place.

In addition, in the configuration in which water is first sprayed onto the floor and left and right spin mops subsequently wipe the floor, there is a high probability that some water is left on the floor and that only a portion of the spin mop is wet with a large amount of water and thus water is not evenly supplied to the entire area of the spin mop. The present invention is configured such that water reaches the first cleaning module before reaching the floor, thereby reducing the probability that water is left on the floor after mopping and facilitating dispersion of water to the entire area of the spin mop.

By allowing the contact area between the rolling member and the floor to overlap the entire area of the gap between the rotation center of the left spin mop and the rotation center of the right spin mop, the rolling member performs an operation of mopping an area of the floor that corresponds to the gap between the left spin mop and the right spin mop, thereby supplementing the mopping operation of the first cleaning module. In addition, the rolling member performs an operation of mopping an area of the floor to which relatively low frictional force is applied from the mop surface of the first cleaning module, thereby supplementing the mopping operation of the first cleaning module.

In addition, by allowing the center of gravity of the water tank and/or the center of gravity of the battery to be located relatively close to the first cleaning module, it is possible to further increase the ratio of the size of the load that is transmitted to the first cleaning module to the size of the load that is transmitted to the second cleaning module and to allow the first cleaning module, which is capable of realizing various operations, to primarily control the travel of the cleaner.

Through the provision of the UV LED that is disposed between the first cleaning module and the second cleaning module, when the cleaner performs cleaning while moving forwards, the UV LED radiates UV rays to the floor mopped by the first cleaning module to sterilize the same, and subsequently the second cleaning module performs an operation of cleaning the floor sterilized by the UV rays.

By supplying sterilized water to the first cleaning module, the UV LED radiates UV rays to the floor mopped with the sterilized water by the first cleaning module to sterilize the same, and subsequently the second cleaning module performs an operation of cleaning the floor sterilized by the UV rays.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

BRIEF DESCRIPTION OF THE DRAWINGS

FIG. 8 is a vertical cross-sectional view of the cleaner 100 taken along line S1-S1' in FIG. 6.

FIG. 9 is a vertical cross-sectional view of the cleaner 100 taken along line S2-S2' in FIG. 6.

DETAILED DESCRIPTION OF THE INVENTION

Figure 1:
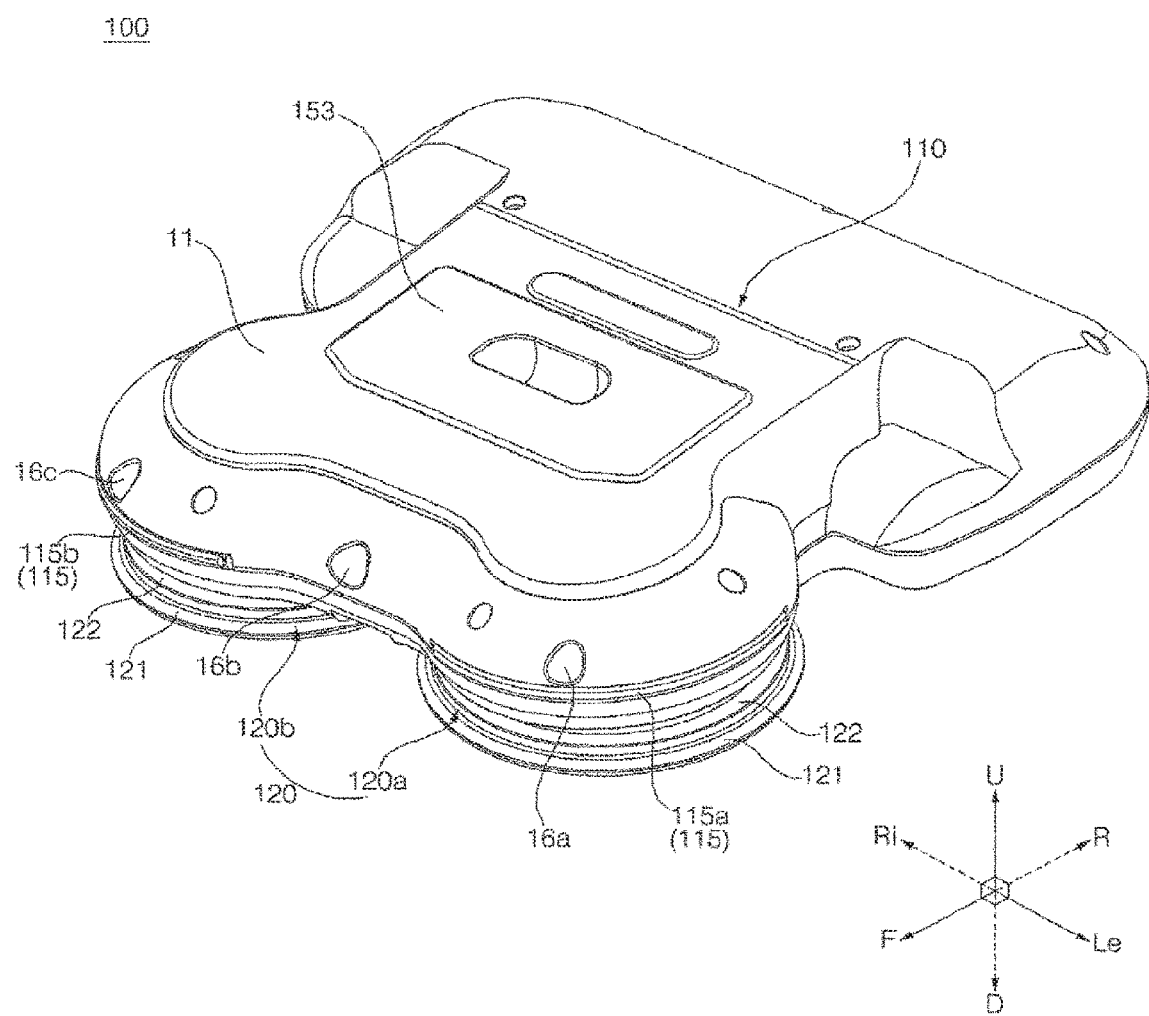
FIG. 1 is a perspective view of a cleaner 100 according to an embodiment of the present invention.
Figure 2:
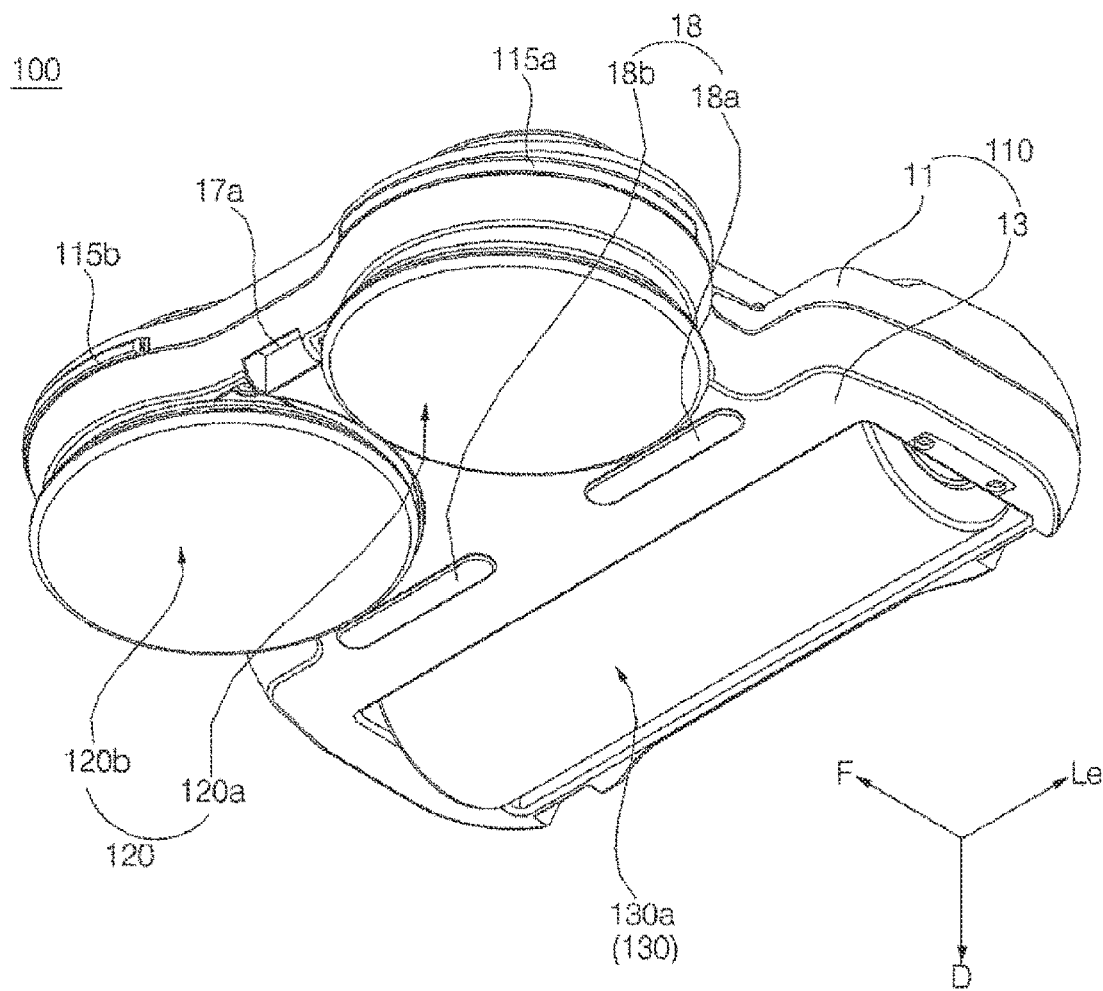
FIG. 2 is a perspective view of the cleaner 100 in FIG. 1 viewed at a different angle.

Expressions referring to directions such as "front (F)/rear (R)/left (Le)/right (R)/upper (U)/lower (D)" mentioned below are defined based on the illustrations in the drawings, but this is merely given to describe the present invention for clear understanding thereof, and it goes without saying that the respective directions may be defined differently depending on where the reference is placed.

Figure 22:
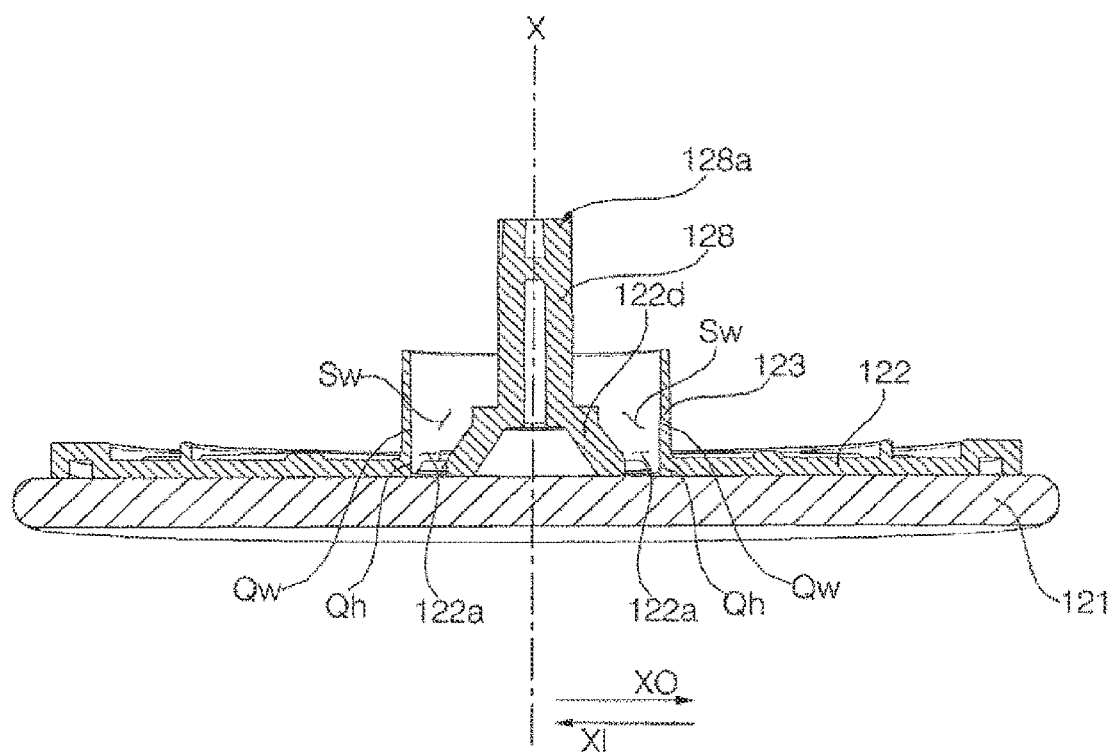
FIG. 22 is a vertical cross-sectional view of the spin mops 120a and 120b taken along line S7-S7' in FIG. 21.
Figure 23:
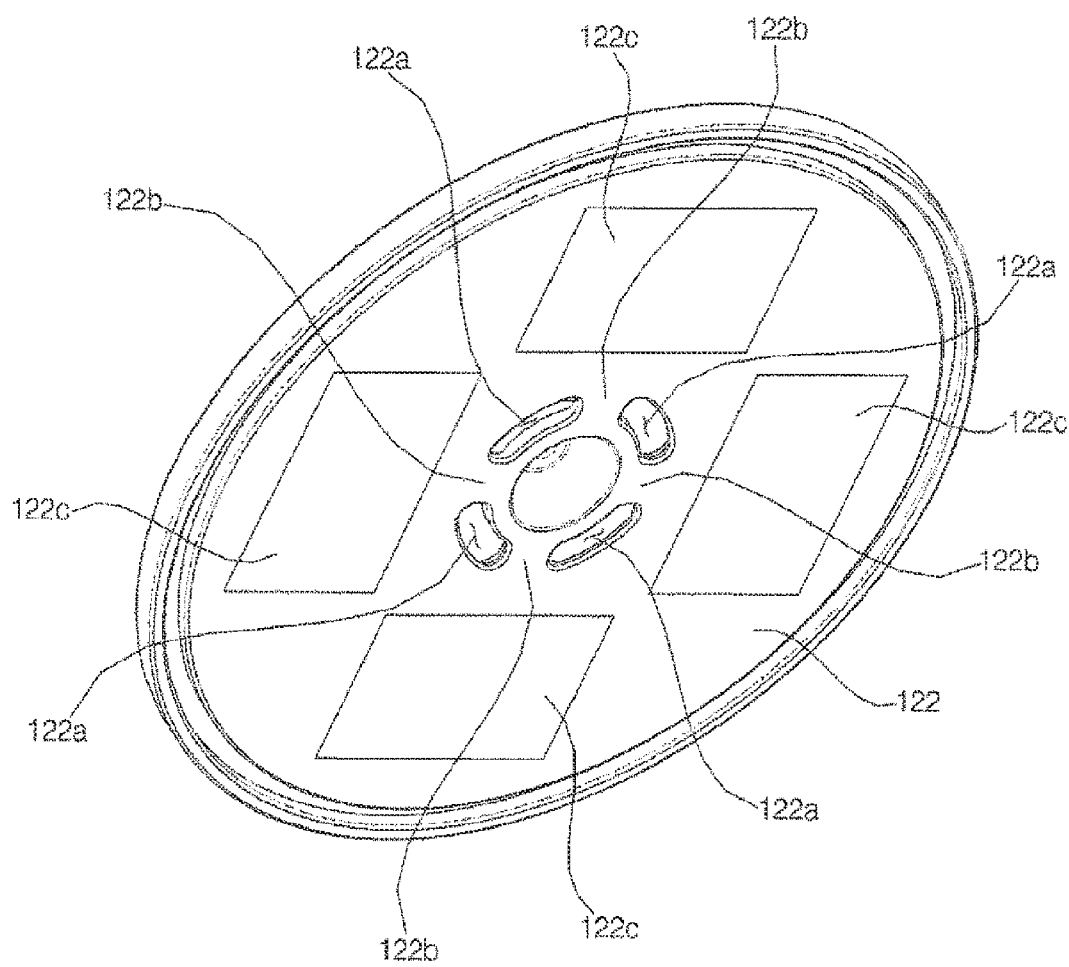
FIG. 23 is a perspective view illustrating the state in which a mop unit 121 is removed from the spin mops 120a and 120b in FIG. 20.

With regard to any one spin mop with reference to FIG. 22, the center axis X is the rotational axis about which the spin mop rotates, the centrifugal direction XO is the direction moving away from the center axis X, and the counter-centrifugal direction XI is the direction approaching the center axis X.

The use of terms, in front of which adjectives such as "first", "second", and "third" are used to describe constituent elements mentioned below, is intended only to avoid confusion of the constituent elements, and is unrelated to the order, importance, or relationship between the constituent elements. For example, an embodiment including only a second component but lacking a first component is also feasible.

The "mop" mentioned below may be variously embodied in terms of material, such as cloth or paper material, and may be used repeatedly by washing, or may be disposable.

The present invention may be applied to a cleaner that is manually moved by a user, a robot cleaner that autonomously travels, or the like. Hereinafter, the present embodiment will be described with reference to a robot cleaner.

Referring to FIGS. 1 to 16B, a cleaner 100 according to an embodiment of the present invention includes a body 110 and a controller 20 mounted in the body 110. The cleaner 100 includes a first cleaning module 120 for supporting the body 110. The cleaner 100 includes a second cleaning module 130 for supporting the body 110. The body 110 is supported by the first cleaning module 120 and the second cleaning module 130.

The first cleaning module 120 is configured to perform mopping via contact with the floor. The first cleaning module 120 includes a left spin mop 120a and a right spin mop 120b, which are configured to perform mopping while rotating clockwise or counterclockwise when viewed from the upper side. The left spin mop 120a and the right spin mop 120b are configured so as to come into contact with the floor. The first cleaning module 120 is disposed at the lower side of the body 110. The first cleaning module 120 is disposed in front of the second cleaning module 130. The cleaner 100 may be configured such that the body 110 can move via rotation of the first cleaning module 120 without a separate driving wheel. That is, the body may move via rotation of the left spin mop 120a and the right spin mop 120b without a separate driving wheel. Here, the term "driving wheel" refers to a wheel having a traveling function to move the body, and thus an auxiliary wheel, which does not have a traveling function but supports the body with respect to the floor, is not considered a driving wheel.

The first cleaning module 120 includes a pair of spin mop modules 120. The first cleaning module 120 includes a left spin mop module 120, which is provided with a left spin mop 120a. The first cleaning module 120 includes a right spin mop module 120, which is provided with a right spin mop 120b. The left spin mop module 120 and the right spin mop module 120 are configured to perform mopping. Each of the left spin mop module 120 and the right spin mop module 120 includes a mop unit 121, a rotating plate 122, a water supply reservoir 123, a spin shaft 128, a spin-drive unit 124, and a driving transmission unit 127. Each of the left spin mop module 120 and the right spin mop module 120 includes a tilting frame 125, a tilting rotary shaft 126, and an elastic member 129. The components that the first cleaning module 120 includes may be understood as components that each of the left spin mop module 120 and the right spin mop module 120 includes.

The second cleaning module 130 is configured so as to come into contact with the floor. The second cleaning module 130 may be configured to perform mopping via contact with the floor. The second cleaning module 130 is disposed at the lower side of the body 110. The second cleaning module 130 is disposed behind the first cleaning module 120 so as to come into contact with the floor.

In the present embodiment, the second cleaning module 130 is configured to perform mopping via rotation thereof. In another example, the second cleaning module may include a mop pad, which performs mopping via sliding on the floor along with the movement of the body 110. In a further example, the second cleaning module may be configured to perform a vacuum-cleaning operation.

The second cleaning module 130 may include a rolling member 130a.

The second cleaning module 130 may be configured to perform mopping or sweeping via rotation thereof. The rolling member 130a may include a mop unit 131 for mopping the floor or a brush (not shown) for sweeping the floor.

In the present embodiment, the rolling member 130a includes a mop unit 131 for mopping the floor. The mop unit 131 is provided so as to be rotatable. The mop unit 131 may rotate about a rotation axis that extends in the substantially horizontal direction. The mop unit 131 may rotate about a rotation axis that extends in the substantially leftward-and-rightward direction.

In another example, the rolling member 130a may include a brush for sweeping the floor. The brush may be rotatably provided. The brush may rotate about a rotation axis that extends in the substantially horizontal direction. The brush may rotate about a rotation axis that extends in the substantially leftward-and-rightward direction. The cleaner may include a dust container. When the brush sweeps the floor, a foreign substance having a relatively large volume may be introduced into the dust container.

Although the present invention will be described below with reference to the present embodiment, the concrete configuration for the cleaning operation of the second cleaning module 130 may be variously modified.

The second cleaning module 130 is configured to perform mopping while rotating clockwise or counterclockwise when viewed from one side (the left side or the right side). The cleaner 100 may be configured such that the body 110 can move via rotation of the second cleaning module 130 without a separate driving wheel. The body 110 may move via rotation of the rolling member 130a without a separate driving wheel.

The cleaner 100 is configured such that the body 110 moves via rotation of at least one of the first cleaning module 120 or the second cleaning module 130 without a separate driving wheel. The body 110 may move only via rotation of the first cleaning module 120. The body 110 may move only via rotation of the second cleaning module 130. The body 110 may move via rotation of the first cleaning module 120 and rotation of the second cleaning module 130. The cleaner 100 is configured such that the body 110 moves via rotation of at least one of the left spin mop 120a, the right spin mop 120b, or the rolling member 130a without a separate driving wheel.

The cleaner 100 includes a water supply module 150 for supplying water required for mopping. The water supply module 150 may supply water required for the mopping operation of the first cleaning module 120 or the second cleaning module 130. In the present embodiment, the water supply module 150 supplies water to the first cleaning module 120. The water supply module 150 supplies water to the left spin mop module 120 and the right spin mop module 120. The water supply module 150 supplies water to the left spin mop 120a and the right spin mop 120b.

The water supply module 150 includes a water tank 151 for storing water that is to be supplied to the first cleaning module 120 or the second cleaning module 130. In the present embodiment, the water tank 151 stores water that is to be supplied to the first cleaning module 120. The water tank 151 is disposed within the body 110.

The water supplied by the water supply module 150 reaches the first cleaning module before reaching the floor. The water supplied by the water supply module 150 reaches the left spin mop 120a and the right spin mop 120b before reaching the floor. The water supplied by the water supply module 150 is supplied to the top surfaces of the left spin mop 120a and the right spin mop 120b, and penetrates the left spin mop 120a and the right spin mop 120b.

The first cleaning module 120 and the second cleaning module 130 are configured to mop the floor. In the present embodiment, the first cleaning module 120 is configured to perform wet mopping (mopping with water), and the water supply module 150 supplies water to the first cleaning module 120. In addition, in the present embodiment, the second cleaning module 130 is configured to perform dry mopping (mopping without water), and the water supply module 150 does not supply water to the second cleaning module 130. In the present embodiment, the water supply module 150 supplies water only to the first cleaning module 120, but not to the second cleaning module 130. According to the present embodiment, configured as described above, when the cleaner 100 performs a cleaning operation via forward movement, the first cleaning module 120 may first perform a wet mopping operation with respect to the floor surface, and subsequently the second cleaning module 130 may perform a dry mopping operation with respect to the wet-mopped floor surface.

Hereinafter, the embodiment will be described under the assumption that the first cleaning module 120 performs wet mopping and the second cleaning module 130 performs dry mopping, but the invention is not limited thereto. The water supply module 150 may be configured to supply water to the second cleaning module 130, rather than to the first cleaning module 120, or may be configured to supply water to both the first cleaning module 120 and the second cleaning module 130.

The cleaner 100 includes a battery 160 for supplying power. The battery 160 may supply power required for rotation of the first cleaning module 120. The battery 160 may supply power required for rotation of the second cleaning module 130.

Figure 11:
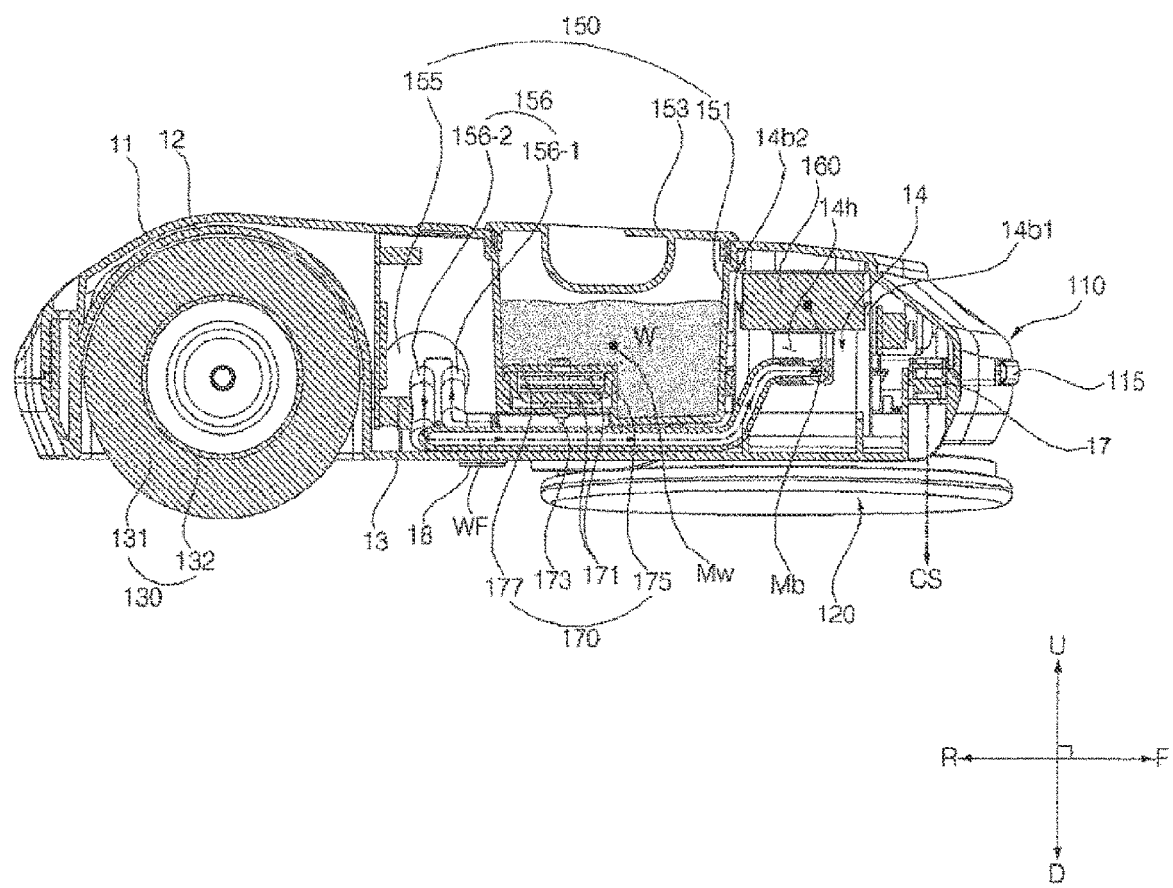
FIG. 11 is a vertical cross-sectional view of the cleaner 100 taken along line S4-S4' in FIG. 6.

Referring to FIG. 11, the center of gravity Mw of the water tank 151 refers to the center of gravity Mw of the water tank 151 and water W in the state in which the water tank 151 is filled with water W. The center of gravity Mw of the water tank 151 may be located closer to the portion of the first cleaning module 120 that contacts the floor than to the portion of the second cleaning module 130 that contacts the floor in the forward-and-backward direction. Because water W has a relatively high specific gravity, the water W may increase the ratio of the amount of weight of the body 110 that is applied to the first cleaning module 120 to the amount of weight of the body 110 that is applied to the second cleaning module 130. Accordingly, the rotation of the first cleaning module 120 has a greater influence on the movement of the body 110 than the rotation of the second cleaning module 130.

Referring to FIG. 11, the center of gravity Mb of the battery 160 may be located closer to the portion of the first cleaning module 120 that contacts the floor than to the portion of the second cleaning module 130 that contacts the floor in the forward-and-backward direction. Because the battery 160 has a relatively high specific gravity, the battery 160 may increase the ratio of the amount of weight of the body 110 that is applied to the first cleaning module 120 to the amount of weight of the body 110 that is applied to the second cleaning module 130. Accordingly, the rotation of the first cleaning module 120 has a greater influence on the movement of the body 110 than the rotation of the second cleaning module 130.

The cleaner 100 includes a case 11 forming the external appearance thereof. The case 11 forms the top surface, the front surface, the rear surface, the left surface and the right surface of the body 110. The cleaner 100 includes a base 13 forming the bottom surface of the body 110. The first cleaning module 120 is fixed to the base 13. The second cleaning module 130 is fixed to the base 13. The cleaner 100 includes a rolling member housing 12, which is disposed at the base 13 and is recessed upwards in order to receive the upper portion of the rolling member 130*a*. The controller 20, the water supply module 150 and the battery 160 are disposed in the internal space, which is defined by the case 11, the base 13 and the rolling member housing 12.

The cleaner 100 includes a water tank opening/closing unit 153 for opening or closing the water tank 151. The water tank opening/closing unit 153 is disposed at the top surface of the body 110. The cleaner 100 may include a water level indicator (not shown) for indicating the water level in the water tank 151. The water level indicator may be formed of a transparent material so that a user can observe the water level in the water tank 151 disposed in the body 110.

The cleaner 100 includes a sensing module (not shown) for sensing the external circumstances. The sensing module may include at least one of a bumper 115 for sensing contact with an external obstacle, an obstacle sensor 16 for sensing an external obstacle that is spaced apart from the cleaner, or a cliff sensor 17 for sensing the presence or absence of a cliff on the traveling surface (the floor). The sensing module may include an image sensor (not shown) for capturing an image of the external circumstances. The cleaner 100 may be configured to move autonomously. It is possible to realize a robot cleaner 100 that is capable of traveling autonomously using information sensed by the sensing module.

The cleaner 100 includes the obstacle sensor 16 that senses an obstacle ahead of the cleaner 100. The obstacle sensor 16 may include a plurality of obstacle sensors 16*a*, 16*b* and 16*c*. The obstacle sensor 16 is disposed at the front surface of the body 110.

The cleaner 100 includes the cliff sensor 17, which senses the presence or absence of a cliff on the floor within the region to be cleaned. The cliff sensor 17 may include a plurality of cliff sensors 17*a*, 17*b* and 17*c*. The cliff sensor 17*a* may sense the presence or absence of a cliff ahead of the first cleaning module 120. The cliff sensors 17*b* and 17*c* may sense the presence or absence of a cliff behind the second cleaning module 130. Referring to FIG. 11, the cliff sensor 17 senses the presence or absence of a cliff by transmitting a sensing signal in the downward direction CS. The cliff sensor 17*a* senses the presence or absence of a cliff in the region ahead of the lowest points P1*a* and P1*b* of the first cleaning module 120. The cliff sensors 17*b* and 17*c* sense the presence or absence of a cliff in the region behind the lowest point (the portion that contacts the floor) of the second cleaning module 130.

The cleaner 100 may include a power switch (not shown) for turning on or off the supply of power. The cleaner 100 may include an input unit (not shown), to which a user inputs various commands. The cleaner 100 may include a communication module (not shown) for communicating with an external device.

The cleaner 100 includes an ultraviolet (UV) light-emitting diode (LED) 18 that emits UV rays downwards. The UV LED 18 is disposed between the first cleaning module 120 and the second cleaning module 130. The UV LED 18 is disposed at the bottom surface of the body 110 so as to emit UV rays to the external floor surface. The UV LED 18 is disposed at the bottom surface of the base 13. The UV LED 18 may include a plurality of UV LEDs 18*a* and 18*b*. The UV LEDs 18*a* and 18*b* include a UV LED 18*a* disposed between the left spin mop 120*a* and the rolling member 130*a* and a UV LED 18*b* disposed between the right spin mop 120*b* and the rolling member 130*a*. Accordingly, when the cleaner 100 performs a cleaning operation via forward movement, the first cleaning module 120 may first perform an operation of mopping the floor, the UV LED 18 may radiate UV rays to the mopped floor to sterilize the same, and subsequently the second cleaning module 130 may perform an operation of cleaning the floor sterilized by the UV rays.

The cleaner 100 may include the communication module (not shown), which is configured to communicate with a predetermined network. According to the communication protocol, the communication module may be implemented using a wireless communication technology, such as IEEE 802.11 WLAN, IEEE 802.15 WPAN, Ultra-Wide Band (UWB), Wi-Fi, ZigBee, Z-wave, Bluetooth, or the like. For example, the communication module may include a UWB sensor so as to detect the current indoor location of the cleaner 100.

The cleaner 100 may include an inertial measurement unit (IMU) (not shown). The cleaner 100 may stabilize the traveling motion thereof based on information from the IMU.

The cleaner 100 includes the controller 20 for controlling the autonomous travel thereof. The controller 20 may receive a sensing signal from the sensing module and may control the traveling of the cleaner. The controller 20 may process the sensing signal of the obstacle sensor 16. The controller 20 may process the sensing signal of the cliff sensor 17. The controller 20 may process the sensing signal of the bumper 115. The controller 20 may process the sensing signal of the UWB sensor and the sensing signal of the IMU. The controller 20 may process the signal of the input unit or the signal transmitted via the communication module. The controller 20 may control the water supply module 150. The controller 20 may control a pump 155 so as to adjust the supplied amount of water. The amount of water that is supplied to the spin mop module 120 per unit time may be adjusted by controlling the pump 155. In another example, the controller 20 may control a valve, which will be described later, in order to control whether to supply water. The controller 20 includes a printed circuit board (PCB) 20 disposed inside the body 110 (refer to FIGS. 15A to 16B).

The body 110 forms the external appearance of the cleaner. The body 110 includes a first unit 111, which is disposed at the upper side of the first cleaning module 120, and a second unit 112, which is disposed at the upper side of the second cleaning module 130 (refer to FIG. 5). The first unit 111 and the second unit 112 are formed integrally with each other. The bottom surface of the body 110, which is formed between the first cleaning module 120 and the second cleaning module 130, is recessed upwards so as to form a body gap 110c. The body gap 110c may be disposed between the first unit 111 and the second unit 112. The body gap 110c may be formed such that the left and right surfaces of the body 110 are recessed inwards.

The body 110 includes the bumper 115 for sensing external shocks. The bumper 115 is disposed at the upper side of the rotating plate 122 of the first cleaning module 120. The bumper 115 is disposed at the front portion and the lateral portions of the body 110. The bumper 115 may include a plurality of bumpers 115a and 115b. The bumper 115a may be disposed at the front portion and the left portion of the left spin mop 120a. The bumper 115b may be disposed at the front portion and the right portion of the right spin mop 120b.

The cleaner 100 includes a contact unit 1151, which is disposed at the edge of the body 110 so as to contact an external object. The contact unit 1151 is formed to extend from the front portion of the body 110 to the lateral portion of the body 110 so as to be bent along the body 110. The cleaner 100 includes a bumper switch 1152, which senses whether the contact unit 1151 is pressed by an external object. The bumper switch 1152 may be configured to be pressed by the contact unit 1151 when the contact unit 1151 is pushed. The bumper switch 1152 may include a first bumper switch 1152a, which is disposed behind the front portion of the contact unit 1151. The bumper switch 1152 may include a second bumper switch 1152b, which is disposed inwards from the lateral portion of the contact unit 1151. When the contact unit 1151 is pushed back, the first bumper switch 1152a is pressed. When the contact unit 1151 is pushed laterally, the second bumper switch 1152b is pressed.

The body 110 includes the case 11 and the base 13, which form the external appearance of the cleaner.

The base 13 has therein an opening, in which a tilting frame 125 is disposed. The tilting frame 125 is connected to the base 13 via a tilting rotary shaft 126. The tilting rotary shaft 126 is rotatably fixed to the base 13.

The base 13 includes a limit for limiting the rotation range of the tilting frame 125. The limit may include an upper-end limit 13d and a lower-end limit 13f.

The base 13 includes the upper-end limit 13d for limiting the upward-rotation range of the tilting frame 125. The left upper-end limit 13d may be disposed on the left of the left tilting frame 125. The right upper-end limit 13d may be disposed on the right of the right tilting frame 125. The left upper-end limit 13d is disposed so as to contact an upper-end-limit contact portion 125f of the left spin mop module 120. The right upper-end limit 13d is disposed so as to contact an upper-end-limit contact portion 125f of the right spin mop module 120. The upper-end-limit contact portion 125f may be disposed at the tilting frame 125. When the cleaner 100 is normally placed on an external horizontal plane, the upper-end-limit contact portion 125f is in contact with the upper-end limit 13d, and inclination angles Ag1 and Ag2 have the smallest values.

The base 13 includes the lower-end limit 13f for limiting the downward-rotation range of the tilting frame 125. The lower-end limit 13f may be disposed at the inner surface of the base 13. The lower-end limit 13f may be disposed at the lower side of the spin-drive unit 124. The lower-end limit 13f is configured to contact a lower-end-limit contact portion 120f when the tilting frame 125 is maximally rotated in the downward direction. The lower-end-limit contact portion 120f may be disposed at the bottom surface of the spin-drive unit 124. When the cleaner 100 is normally placed on an external horizontal plane, the lower-end-limit contact portion 120f is spaced apart from the lower-end limit 13f. In the state in which there is no force on the bottom surfaces of the spin mops 120a and 120b to push the same upwards, the tilting frame 125 is rotated to a maximum angle, the lower-end-limit contact portion 120f comes into contact with the lower-end limit 13f, and the inclination angles Ag1 and Ag2 have the largest values.

The base 13 includes a second support portion 13b for fixing an end of the elastic member 129. When the tilting frame 125 is rotated, the elastic member 129 is elastically deformed or elastically restored by a first support portion 125d fixed to the tilting frame 125 and the second support portion 13b fixed to the base 13.

The base 13 includes a tilting rotary shaft support portion 13c for supporting the tilting rotary shaft 126. The tilting rotary shaft support portion 13c supports two opposite ends of the tilting rotary shaft 126.

The base 13 may include a separate support member 13a for supporting the tilting frame 125. The support member 13a may be formed as a part separate from the remaining portion of the base 13. The support member 13a extends along the periphery of the opening formed in the bottom surface of the base 13. The support member 13a has an opening formed in the center portion thereof, and the tilting frame 125 is disposed in the opening.

The support member 13a may include the second support portion 13b. The support member 13a may include the tilting rotary shaft support portion 13c. The support member 13a may include the upper-end limit 13d. The support member 13a includes a support member fixing portion 13e, which is coupled to the other portion of the base 13.

Referring to FIGS. 2 to 6, 9 to 11, and 19, the second cleaning module 130 is configured to contact the floor behind the first cleaning module 120. The second cleaning module 130 is configured to perform mopping via contact with the floor along with the movement of the body 110. The second cleaning module 130 is configured to perform dry mopping.

The second cleaning module 130 may include the rolling member 130a, which rotates about a rotation axis Or that extends in the horizontal direction. In the present embodiment, the rotation axis Or extends in the leftward-and-rightward direction. However, in another embodiment, the rotation axis Or may extend in the forward-and-backward direction, or may extend in a direction intermediate to the forward-and-backward direction and the leftward-and-rightward direction. Accordingly, a force that moves the body 110 in the horizontal direction (the direction perpendicular to the rotation axis Or) may be applied to the body 110 by rotation of the rolling member 130a. Since the moving force generated by the rolling member 130a is additionally applied to the body 110 in addition to the moving force applied to the body 110 by the first cleaning module 120, it is possible to realize various types of traveling motion of the cleaner 100.

In the present embodiment, the second cleaning module 130 includes the rolling member 130a, which rotates about the rotation axis Or, which extends in the leftward-and-rightward direction. The rolling member 130a may rotate about the rotation axis Or, which extends in the direction parallel to the direction in which the left spin mop 120a and the right spin mop 120b are arranged. Accordingly, a force that moves the body 110 in the forward-and-backward direction may be applied to the body 110 by rotation of the rolling member 130a. Since the moving force generated by the rolling member 130a is additionally applied to the body 110 in the forward-and-backward direction in addition to the moving force applied to the body 110 by the first cleaning module 120, it is possible to efficiently realize various types of traveling motion of the cleaner 100. A detailed explanation of the various types of traveling motion will be made later.

Figure 6:
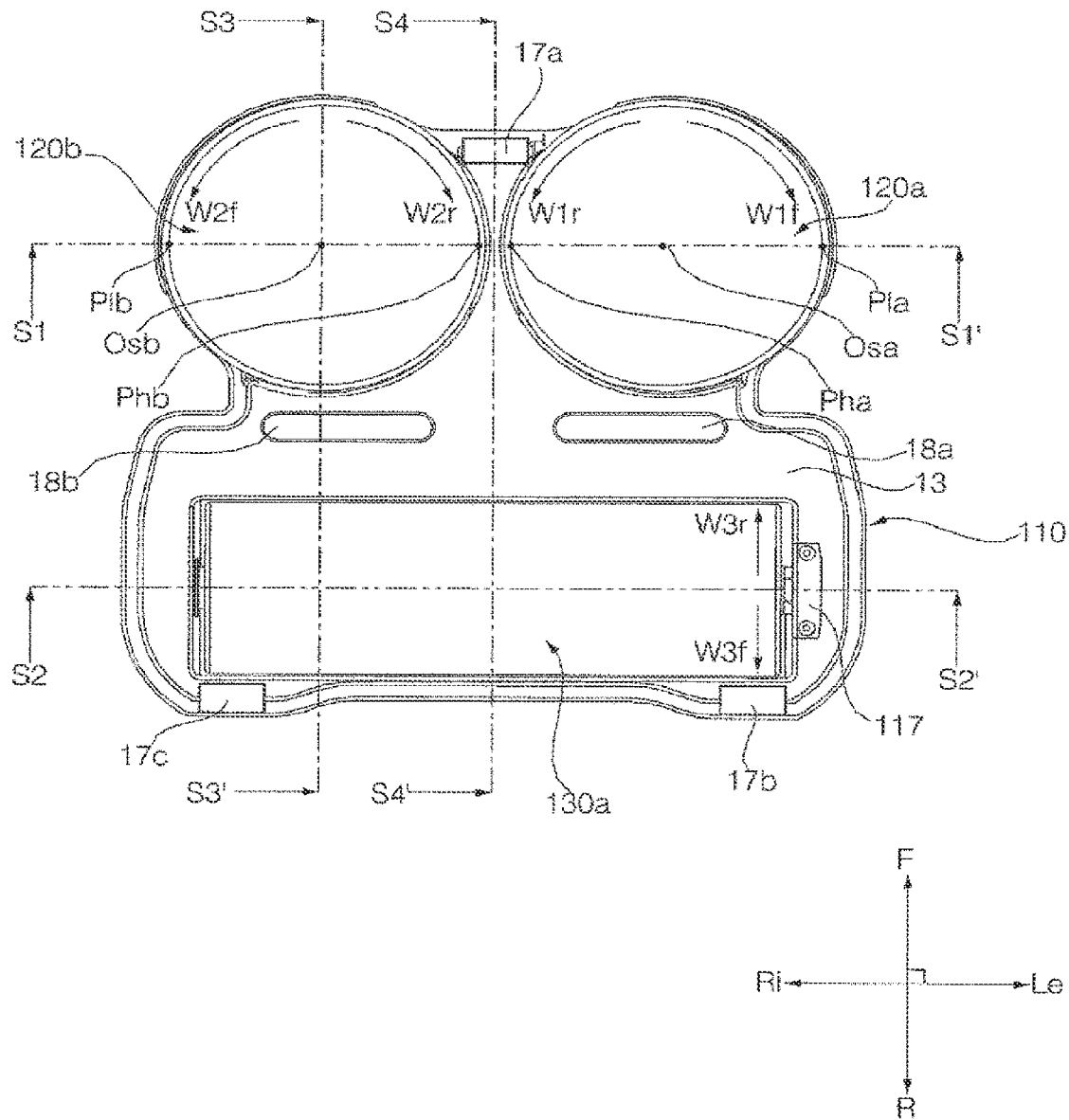
FIG. 6 is a bottom view of the cleaner 100 in FIG. 1.
Figure 7:
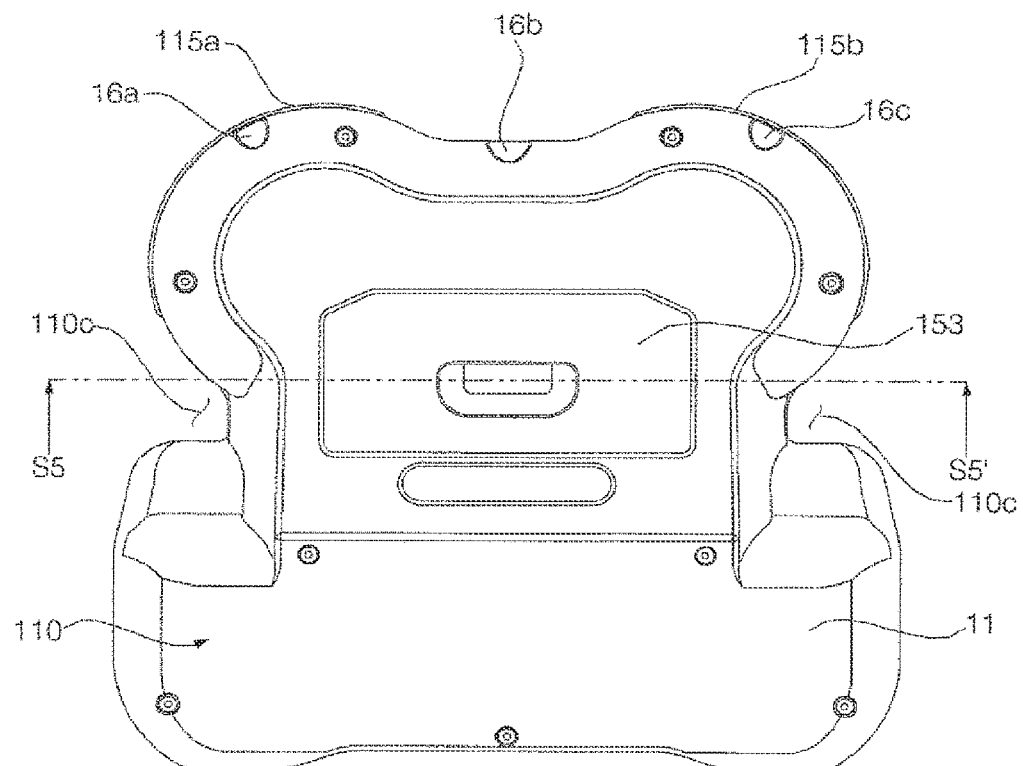
FIG. 7 is a top view of the cleaner 100 in FIG. 1.
Figure 7:
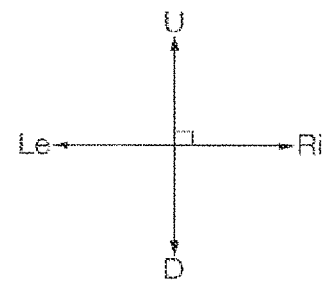
Figure 10:
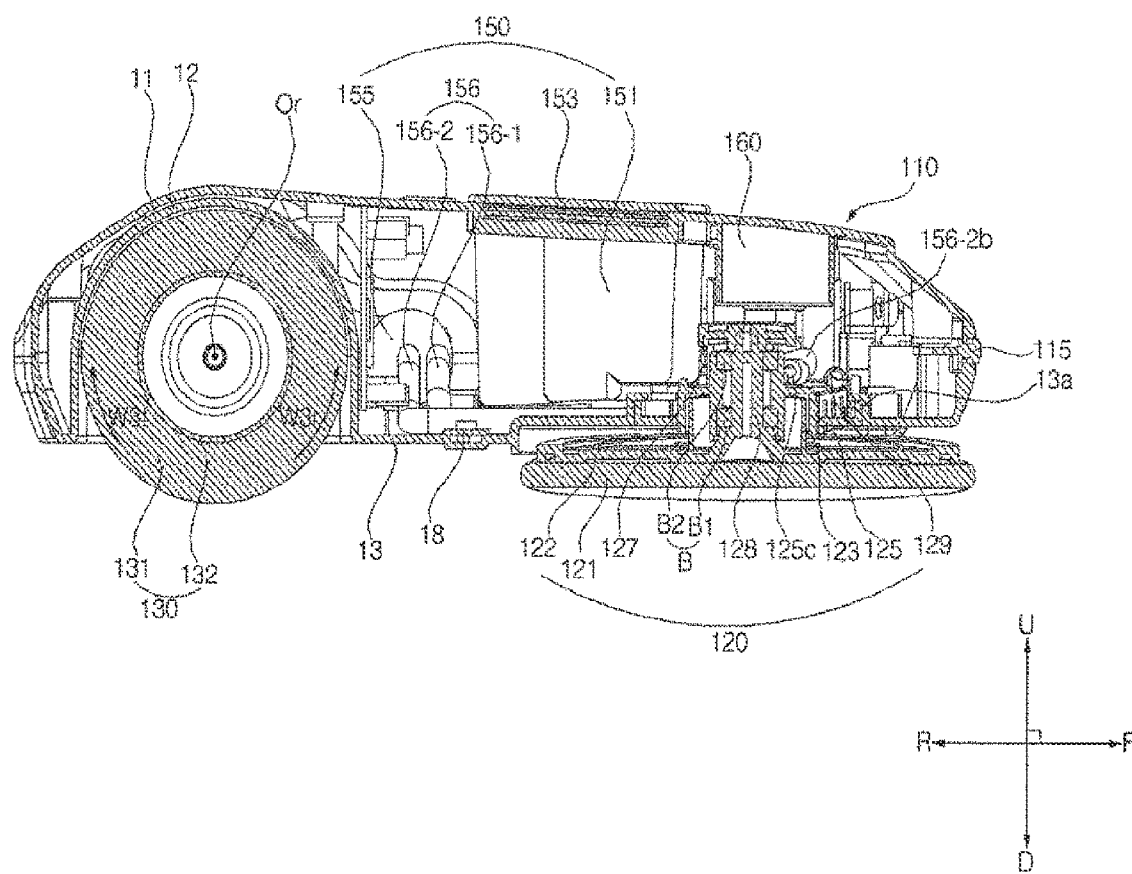
FIG. 10 is a vertical cross-sectional view of the cleaner 100 taken along line S3-S3' in FIG. 6.

Referring to FIGS. 6 and 10, when viewed from the right side, the clockwise rotation direction of the rolling member 130a is defined as a third forward direction w3f, and the counterclockwise rotation direction of the rolling member 130a is defined as a third reverse direction w3r.

When the cleaner 100 moves forwards, the rolling member 130a follows the first cleaning module 120, and performs an operation of mopping the floor that has been cleaned by the first cleaning module 120. The rolling member 130a is configured to perform a dry mopping operation so as to remove moisture from the floor that has been wet-mopped by the left spin mop 120a and the right spin mop 120b. In the present embodiment, the second cleaning module 130 includes one rolling member 130a. However, in another embodiment, the second cleaning module 130 may include a plurality of rolling members. Each of the rolling members may be configured to rotate about a corresponding one of the rotation axes that are arranged parallel to each other.

The second cleaning module 130 includes the mop unit 131 or the brush. A portion of the weight of the body 110 may be transmitted to the floor via the mop unit 131 or the brush. The mop unit 131 or the brush is arranged to surround the periphery of a rotary member 132. The mop unit 131 or the brush is arranged along the periphery about the rotation axis Or. The mop unit 131 or the brush may be fixedly coupled to the rotary member 132, or may be separably coupled to the rotary member 132.

In the present embodiment, the second cleaning module 130 includes the mop unit 131. A portion of the weight of the body 110 may be transmitted to the floor via the mop unit 131. The mop unit 131 is arranged to surround the periphery of the rotary member 132. The mop unit 131 is arranged along the periphery about the rotation axis Or. The mop unit 131 may be fixedly coupled to the rotary member 132, or may be separably coupled to the rotary member 132.

The second cleaning module 130 includes the rotary member 132, which is configured so as to rotate.

The mop unit 131 or the brush of the rolling member 130a is fixed to the rotary member 132. The rotary member 132 may rotate together with the mop unit 131 or the brush.

In the present embodiment, the mop unit 131 of the rolling member 130a is fixed to the rotary member 132. The rotary member 132 may rotate together with the mop unit 131.

The rotary member 132 is rotated by receiving drive force from a rolling drive unit 137. The rotary member 132 rotates about the rotation axis Or.

The rotary member 132 is formed in a cylindrical shape. The rotary member 132 is formed so as to be elongated in the direction in which the rotation axis Or extends. The rotary member 132 has therein a hollow portion 132s. The mop unit 131 is fixed to the outer circumferential surface of the rotary member 132.

The second cleaning module 130 includes a first shaft member 134, which is disposed at one end portion of the rotary member 132. The second cleaning module 130 includes a second shaft member 135, which is disposed at the opposite end portion of the rotary member 132. The first shaft member 134 and the second shaft member 135 are respectively disposed at the two opposite ends of the second cleaning module 130 in the direction in which the rotation axis Or extends. In the present embodiment, the first shaft member 134 is disposed at the right end portion of the rotary member 132, and the second shaft member 135 is disposed at the left end portion of the rotary member 132. The one end portion of the rotary member 132 is recessed in the inward direction, and the first shaft member 134 is disposed in the recessed portion in the one end portion of the rotary member 132. The opposite end portion of the rotary member 132 is recessed in the inward direction, and the second shaft member 135 is disposed in the recessed portion of the opposite end portion of the rotary member 132.

The first shaft member 134 connects the one end portion of the rotary member 132 and the body 110 to each other. The first shaft member 134 is fixedly connected to the rotary member 132. The first shaft member 134 is formed to protrude in the direction in which the rotation axis Or extends. In the present embodiment, the first shaft member 134 protrudes to the right. The first shaft member 134 is inserted into a recess formed in a drive force transmission unit 137a so as to rotate simultaneously when the drive force transmission unit 137a rotates. The cross-section of the first shaft member 134 that is perpendicular to the rotary shaft Or has a shape other than a circular shape (for example, a polygonal shape). The drive force transmission unit 137a has therein a recess formed in a shape that corresponds to the shape of the first shaft member 134.

The second shaft member 135 connects the opposite end portion of the rotary member 132 and the body 110 to each other. The second shaft member 135 is rotatably connected to the rotary member 132. The second shaft member 135 is formed to protrude in the direction in which the rotation axis Or extends. In the present embodiment, the second shaft member 135 protrudes to the left. The second shaft member 135 is fixedly inserted into recesses formed in the body 110 and a coupler 117. When the first shaft member 134 is rotated by the drive force transmission unit 137a, the rotary member 132 and the mop unit 131 rotate together with the first shaft member 134. The rotary member 132 rotates relative to the fixed second shaft member 135. A bearing may be disposed between the second shaft member 135 and the rotary member 132. The cross-section of the second shaft member 135 that is perpendicular to the rotary shaft Or has a shape other than a circular shape (for example, a polygonal shape). The body 110 and/or the coupler 117 have therein recesses formed in a shape that corresponds to the shape of the second shaft member 135.

The second cleaning module 130 includes the rolling drive unit 137 that provides drive force for rotating the rolling member 130a. The rolling drive unit 137 provides drive force for rotating the rotary member 132. The rolling drive unit 137 includes a motor 137d. The motor 137d is disposed in the body 110. The rolling drive unit 137 includes a gear assembly 137c for transmitting torque of the motor 137d. The gear assembly 137c includes a plurality of gears that mesh with each other and rotate. For example, the gears may include a driving gear, which rotates together with the shaft of the motor 137d, and a driven gear, which meshes with the driving gear and rotates. The driven gear may be provided in a plural number, and the plurality of driven gears may mesh with each other and may rotate. The rolling drive unit 137 may include a shaft 137b, which rotates together with any one of the driven gears. The rolling drive unit 137 may include the drive force transmission unit 137a that transmits rotational force to the first shaft member 134. The shaft 137b transmits the rotational force of the one of the driven gears to the drive force transmission unit 137a. The drive force transmission unit 137a has therein a recess, into which the first shaft member 134 is inserted. The shaft 137b, the drive force transmission unit 137a and the first shaft member 134 rotate together with each other.

The cleaner 100 may include the coupler 117, which is separably coupled to the body 110. The coupler 117 is disposed at the base 13. The coupler 117 supports the lower end of the second shaft member 135. The second shaft member 135 is supported by the base 13. The coupler 117 may have therein a recess, into which the second shaft member 135 is inserted. The rotary member 132 and the mop unit 131 may be removed from or coupled to the body 110 using the coupler 117. For example, in the state in which the coupler 117 is removed, a user is capable of easily drawing the first shaft member 134 out of the drive force transmission unit 137a after pulling the end portion of the rotary member 132, at which the second shaft member 135 is disposed, out of the body 110. Conversely, in the state in which the coupler 117 is removed, the end portion of the first shaft member 134 may first be inserted into the recess in the drive force transmission unit 137a, and subsequently the second shaft member 135 and the coupler 117 may be inserted into the body 110. In order to maintain the coupling of the rotary member 132 to the body 110, a user may fix the coupler 117 to the body 110. Further, in order to remove the rotary member 132 from the body 110, a user may remove the coupler 117 from the body 110.

Referring to FIGS. 1 to 6, 8, 10, and 12 to 23, the first cleaning module 120 includes the left spin mop 120a and the right spin mop 120b, which are configured to contact the floor while rotating clockwise or counterclockwise when viewed from the upper side. The first cleaning module 120 is configured to perform mopping via rotation of the left spin mop 120a and the right spin mop 120b.

Among the components of the first cleaning module 120, a component in which "left" is affixed to the front of the name thereof is a component for operating the left spin mop 120a, and a component in which "right" is affixed to the front of the name thereof is a component for operating the right spin mop 120b. In a description related to the components of the first cleaning module 120, when it is unnecessary to distinguish "left" and "right" from each other, the corresponding description may be applied to both "left" and "right".

Referring to FIG. 6, the point at which the rotation axis of the left spin mop 120a and the bottom surface of the left spin mop 120a meet is defined as a rotation center Osa of the left spin mop 120a. The point at which the rotation axis of the right spin mop 120b and the bottom surface of the right spin mop 120b meet is defined as a rotation center Osb of the right spin mop 120b. When viewed from the lower side, the clockwise rotation direction of the left spin mop 120a is defined as a first forward direction w1f, and the counterclockwise rotation direction of the left spin mop 120a is defined as a first reverse direction w1r. When viewed from the lower side, the counterclockwise rotation direction of the right spin mop 120b is defined as a second forward direction w2f, and the clockwise rotation direction of the right spin mop 120b is defined as a second reverse direction w2r.

Referring to FIG. 6, when the left spin mop 120a rotates, the point Pla on the bottom surface of the left spin mop 120a that receives the largest frictional force from the floor is located to the left of the rotation center Osa of the left spin mop 120a. The largest frictional force may be generated at the point Pla by transmitting a larger load from the point Pla to the floor than from any other point on the bottom surface of the left spin mop 120a. In the present embodiment, the point Pla is located exactly to the left of the rotation center Osa. However, in another embodiment, the point Pla may be located to the left and in front of the rotation center Osa or to the left and behind the rotation center Osa.

Referring to FIG. 6, when the right spin mop 120b rotates, the point Plb on the bottom surface of the right spin mop 120b that receives the largest frictional force from the floor is located to the right of the rotation center Osb of the right spin mop 120b. The largest frictional force may be generated at the point Plb by transmitting a larger load from the point Plb to the floor than from any other point on the bottom surface of the right spin mop 120b. In the present embodiment, the point Plb is located exactly to the right of the rotation center Osb. However, in another embodiment, the point Plb may be located to the right and in front of the rotation center Osb or to the right and behind the rotation center Osb.

The point Pla and the point Plb are located at positions that are bilaterally symmetrical to each other.

In order to make the point Pla receive larger frictional force from the floor than any other point on the bottom surface of the left spin mop 120a (or in order to make the point Plb receive larger frictional force from the floor than any other point on the bottom surface of the right spin mop 120b), configuration may be variously made according to the embodiments set forth below.

Figure 3A:
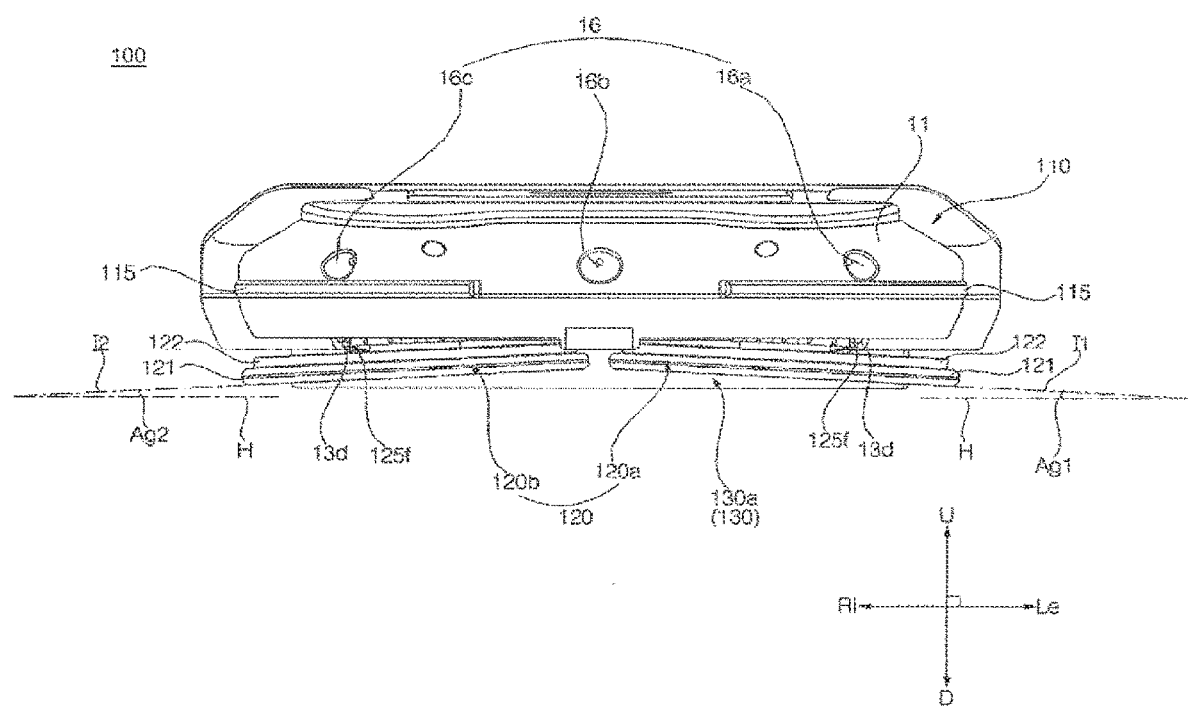
FIG. 3A is a front elevational view of the cleaner 100 in FIG. 1.

In one embodiment illustrated in FIG. 3A, the left spin mop 120a may be arranged such that the bottom surface thereof is inclined downwards in the direction from the rotation center Osa to the point Pla. In this case, the point Pla becomes the lowest point Pla on the bottom surface of the left spin mop 120a. In this case, the angle that the bottom surface I1 of the left spin mop 120a makes with an imaginary horizontal plane H and the angle that the bottom surface I2 of the right spin mop 120b makes with the imaginary horizontal plane H are defined as the inclination angles Ag1 and Ag2. The angle that the bottom surface I1 of the left spin mop 120a makes with the external horizontal plane H is the inclination angle Ag1, and the angle that the bottom surface I2 of the right spin mop 120b makes with the external horizontal plane H is the inclination angle Ag2. These two inclination angles Ag1 and Ag2 may be the same as each other.

Figure 3B:
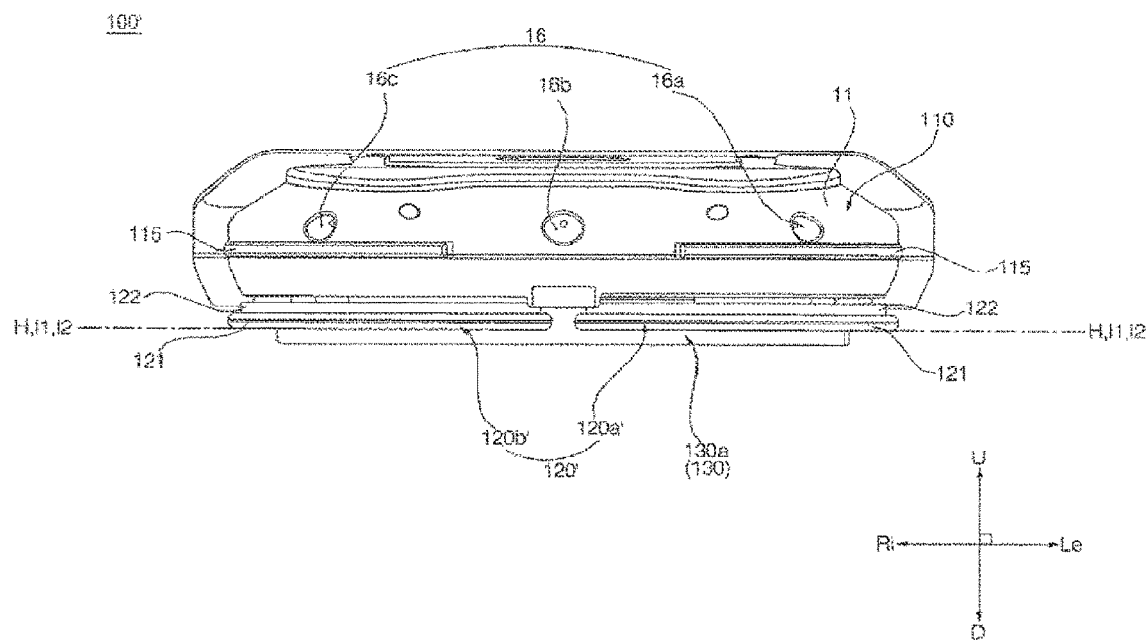
FIG. 3B is a front elevational view of a cleaner 100' according to another embodiment of the present invention.
Figure 4:
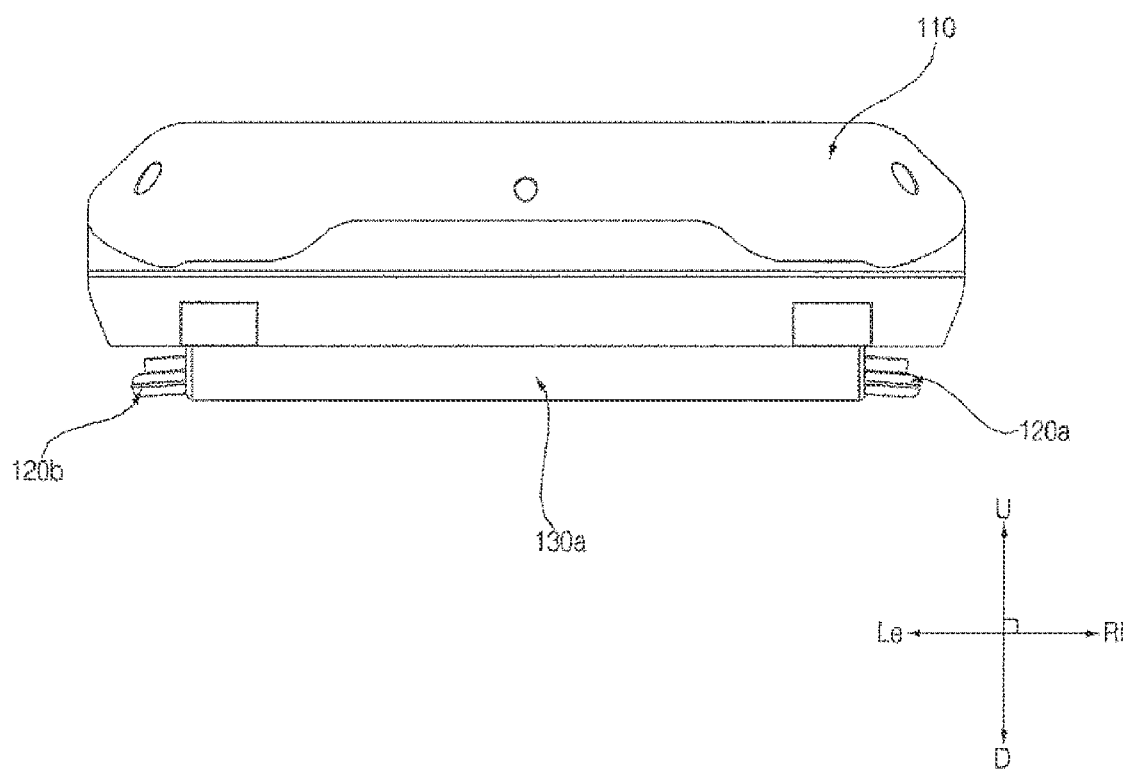
FIG. 4 is a rear elevational view of the cleaner 100 in FIG. 1.
Figure 5:
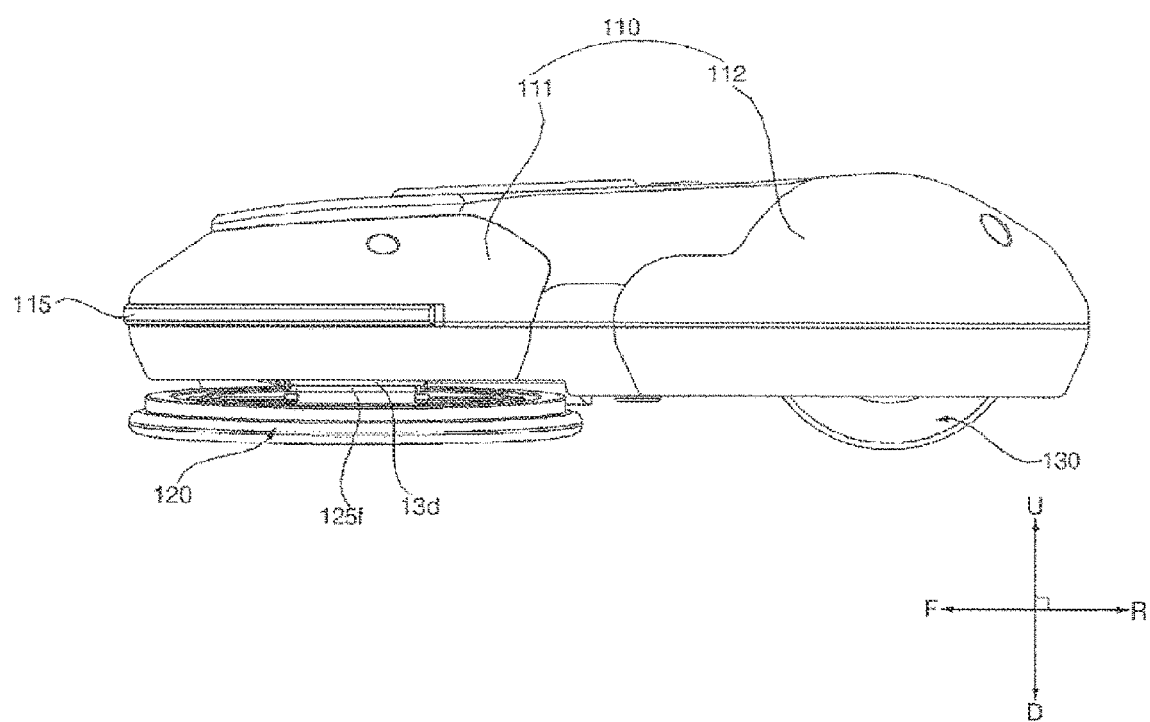
FIG. 5 is a (left) side elevational view of the cleaner 100 in FIG. 1.

In another embodiment illustrated in FIG. 3B, the left spin mop 120a may be arranged such that the bottom surface thereof lies horizontally. The embodiment may be configured such that a moment is applied to the left spin mop 120a using an elastic member. The moment applied to the left spin mop 120a is a clockwise moment when viewed from the front side. In this case, even when the left spin mop 120a lies horizontally with respect to the external horizontal plane H, the point Pla comes into strongest contact with the external horizontal plane H, thereby generating the largest frictional force. A detailed description of a first embodiment and a second embodiment for realizing the above characteristics will now be made.

In the first embodiment, the first cleaning module 120 is disposed at a tilting frame 125, which will be described later. The moment may be applied to the first cleaning module 120 by the elastic force of an elastic member 129, which will be described later. As shown in FIG. 3B, in the state in which the upper-end-limit contact portion 125f is in contact with the upper-end limit 13d, the bottom surfaces of the spin mops 120a and 120b are arranged parallel to the horizontal plane H. In particular, when the left spin mop 120a lies horizontally, the elastic member 129 is elastically deformed to the maximum extent. When the point Pla of the left spin mop 120a is located at a lower position than any other point, the extent of elastic deformation of the elastic member 129 is reduced.

In the second embodiment, a plurality of springs (not shown) may be arranged on the top surface of a lower rotating plate (not shown), which fixes the bottom surface of the left spin mop 120a, in the rotation direction about the rotation axis. In this case, an upper rotating plate (not shown), which supports the upper ends of the springs, may be arranged at a downward incline in the direction from the rotation center Osa to the point Pla. When the upper rotating plate rotates, the respective springs also rotate and undergo elastic compression and elastic restoration repeatedly. At this time, among the springs, the spring that is disposed near the point Pla on the basis of the rotation center Osa is compressed to the largest extent. Accordingly, the point Pla receives larger frictional force from the floor than any other point on the bottom surface of the left spin mop 120a.

In order to make the point Plb receive larger frictional force from the floor than any other point on the bottom surface of the right spin mop 120b, the above-described embodiment, the first embodiment, and the second embodiment may be applied in the same manner by those skilled in the art. Hereinafter, a description will be made with reference to the above-described embodiment (refer to FIG. 3A).

The bottom surface of the left spin mop 120a and the bottom surface of the right spin mop 120b are each arranged at an incline. The inclination angle Ag1 of the left spin mop 120a and the inclination angle Ag2 of the right spin mop 120b are acute angles. In the present embodiment, the inclination angles Ag1 and Ag2 respectively range from about 3 to 6 degrees. The inclination angles Ag1 and Ag2 may be set to be small such that the points Pla and Plb receive the largest frictional force and such that the entire bottom area of the mop unit 121 contacts the floor via rotation of the left spin mop 120a and the right spin mop 120b.

The bottom surface of the left spin mop 120a extends at a downward incline in the leftward direction. The bottom surface of the right spin mop 120b extends at a downward incline in the rightward direction. Referring to FIG. 6, the bottom surface of the left spin mop 120a has the lowest point Pla located at the left portion thereof. The bottom surface of the left spin mop 120a has the highest point Pha located at the right portion thereof. The bottom surface of the right spin mop 120b has the lowest point Plb located at the right portion thereof. The bottom surface of the right spin mop 120b has the highest point Phb located at the left portion thereof.

Referring to FIG. 6, the movement of the cleaner 100 is implemented by the frictional force that the first cleaning module 120 and/or the second cleaning module 130 generate with the floor.

The first cleaning module 120 may generate forward-movement frictional force for moving the body 110 forwards or backward-movement frictional force for moving the body 110 backwards. The first cleaning module 120 may generate leftward-moment frictional force for turning the body 110 to the left or rightward-moment frictional force for turning the body 110 to the right. The first cleaning module 120 may generate frictional force that is a combination of any one of the forward-movement frictional force and the backward-movement frictional force and any one of the leftward-moment frictional force and the rightward-moment frictional force.

The second cleaning module 130 may generate forward-movement frictional force for moving the body 110 forwards or backward-movement frictional force for moving the body 110 backwards.

In order to generate the forward-movement frictional force, the first cleaning module 120 may rotate the left spin mop 120a at a predetermined number of revolutions per minute (rpm) R1 in the first forward direction w1f, and may rotate the right spin mop 120b at the predetermined rpm R1 in the second forward direction w2f.

In order to generate the forward-movement frictional force, the second cleaning module 130 may rotate the rolling member 130a in the third forward direction w3f.

In order to generate the backward-movement frictional force, the first cleaning module 120 may rotate the left spin mop 120a at a predetermined rpm R2 in the first reverse direction w1r, and may rotate the right spin mop 120b at the predetermined rpm R2 in the second reverse direction w2r.

In order to generate the backward-movement frictional force, the second cleaning module 130 may rotate the rolling member 130a in the third reverse direction w3r.

In order for the first cleaning module 120 to generate the rightward-moment frictional force, the left spin mop 120a may be rotated at a predetermined rpm R3 in the first forward direction w1f, and the right spin mop 120b may be operated as follows: (i) it may be rotated in the second reverse direction w2r; (ii) it may be stopped without rotation; or (iii) it may be rotated in the second forward direction w2f at a predetermined rpm R4, which is lower than the rpm R3.

In order for the first cleaning module 120 to generate the leftward-moment frictional force, the right spin mop 120b may be rotated at a predetermined rpm R5 in the second forward direction w2f, and the left spin mop 120a may be operated as follows: (i) it may be rotated in the first reverse direction w1r; (ii) it may be stopped without rotation; or (iii) it may be rotated in the first forward direction w1f at a predetermined rpm R6, which is lower than the rpm R5.

It is possible for the body 110 to move or to stay in place via a combination of the frictional force generated by the first cleaning module 120 and the frictional force generated by the second cleaning module 130.

In order for the cleaner 100 to move straight forwards, both the first cleaning module 120 and the second cleaning module 130 may generate the forward-movement frictional force. In another example, any one of the first cleaning module 120 and the second cleaning module 130 may generate the forward-movement frictional force, and the remaining one thereof may remain stationary without rotating. In a further example, any one of the first cleaning module 120 and the second cleaning module 130 may generate relatively large forward-movement frictional force, and the remaining one thereof may generate relatively small backward-movement frictional force.

In order for the cleaner 100 to move straight backwards, both the first cleaning module 120 and the second cleaning module 130 may generate the backward-movement frictional force. In another example, any one of the first cleaning module 120 and the second cleaning module 130 may generate the backward-movement frictional force, and the remaining one thereof may remain stationary without rotating. In a further example, any one of the first cleaning module 120 and the second cleaning module 130 may generate relatively large backward-movement frictional force, and the remaining one thereof may generate relatively small forward-movement frictional force.

In order to turn the cleaner 100 to the right, the first cleaning module 120 may generate the rightward-moment frictional force, and the rolling member 130a may be operated as follows: (i) it may be rotated in the third forward direction w3f, (ii) it may be stopped without rotation, or (iii) it may be rotated in the third reverse direction w3r.

In order to turn the cleaner 100 to the left, the first cleaning module 120 may generate the leftward-moment frictional force, and the rolling member 130a may be operated as follows: (i) it may be rotated in the third forward direction w3f, (ii) it may be stopped without rotation; or (iii) it may be rotated in the third reverse direction w3r.

In order for the cleaner 100 to stay in place, both the first cleaning module 120 and the second cleaning module 130 may remain stationary without rotating. In another example, any one of the first cleaning module 120 and the second cleaning module 130 may generate forward-movement frictional force, and the remaining one thereof may generate backward-movement frictional force that has the same magnitude as the forward-movement frictional force. In particular, in the latter case, while the body 110 stays in place, the first cleaning module 120 and the second cleaning module 130 may respectively rotate and perform an operation of mopping a certain area of the floor.

According to the above-described processes of controlling the movement of the body 110, the direction in which the rolling member 130a rotates can be changed. Accordingly, it is possible to combine any one of the forward-movement frictional force and the backward-movement frictional force, which are generated by the rolling member 130a, with the frictional force generated by the first cleaning module 120, thereby facilitating various types of movement of the cleaner 100. Specifically, it is possible to increase the maximum speed of the cleaner 100 in the forward-and-backward direction, to enable the cleaner 100 to be turned to the right or to the left with various turn radii, to enable the cleaner 100 to be turned to the right or to the left while traveling backwards, and to enable the cleaner 100 to perform a mopping operation via rotation while the body 110 stays in place.

While the first cleaning module 120 performs a predetermined constant rotation operation (an operation of generating the forward-movement frictional force, the backward-movement frictional force, the leftward-moment frictional force, or the rightward-moment frictional force), the rolling member 130a may perform two or more different rotation operations. While the first cleaning module performs a predetermined constant rotation operation, the rolling member 130a may be controlled to rotate in the third forward direction w3f. While the first cleaning module performs a predetermined constant rotation operation, the rolling member 130a may be controlled to rotate in the third reverse direction w3r. While the first cleaning module performs a predetermined constant rotation operation, the rolling member 130a may be controlled to remain stationary without rotating. While the first cleaning module performs a predetermined constant rotation operation, the rolling member 130a may be controlled to rotate in the third forward direction w3f at one selected from among two or more predetermined RPMs. While the first cleaning module performs a predetermined constant rotation operation, the rolling member 130a may be controlled to rotate in the third reverse direction w3r at one selected from among two or more predetermined RPMs. As such, it is possible to realize various traveling routes and traveling speeds of the cleaner 100.

The contact area between the rolling member 130a and the floor may be formed to be elongated in the leftward-and-rightward direction. The right end of the left spin mop 120a and the left end of the right spin mop 120b may be spaced a predetermined distance apart from each other. When viewed from the front side, the contact area between the rolling member 130a and the floor may overlap the entire area of the gap between the left spin mop 120a and the right spin mop 120b. The gap between the left spin mop 120a and the right spin mop 120b is a portion of the first cleaning module 120 that may not perform mopping sufficiently well. When the cleaner 100 moves in the forward-and-backward direction, the rolling member 130a performs an operation of mopping an area of the floor that corresponds to the gap, thereby supplementing the mopping operation of the first cleaning module 120.

The contact area between the rolling member 130a and the floor may be formed to be elongated in the leftward-and-rightward direction. When viewed from the front side, the contact area between the rolling member 130a and the floor may overlap the entire area between the rotation center Osa of the left spin mop 120a and the rotation center Osb of the right spin mop 120b. The right side of the rotation center Osa of the left spin mop 120a and the left side of the rotation center Osb of the right spin mop 120b are portions to which relatively low frictional force is applied, and thus may not perform mopping sufficiently well, compared to the left side of the rotation center Osa of the left spin mop 120a and the right side of the rotation center Osb of the right spin mop 120b. When the cleaner 100 moves in the forward-and-backward direction, the rolling member 130a performs an operation of mopping an area of the floor located between the rotation center Osa of the left spin mop 120a and the rotation center Osb of the right spin mop 120b, thereby supplementing the mopping operation of the first cleaning module 120.

Referring to FIGS. 20 to 23, the first cleaning module 120 includes the rotating plate 122, which is rotatably provided at the lower side of the body 110. The rotating plate 122 may be formed by a circular plate member. The mop unit 121 is fixed to the bottom surface of the rotating plate 122. The spin shaft 128 is fixed to the center portion of the rotating plate 122.

The first cleaning module 120 includes the left rotating plate 122, which fixes the mop unit 121 of the left spin mop 120a, and the right rotating plate 122, which fixes the mop unit 121 of the right spin mop 120b.

The rotating plate 122 includes a mop-fixing member 122c, which fixes the mop unit 121. The mop unit 121 may be separably fixed to the mop-fixing member 122c. The mop-fixing member 122c may be a piece of Velcro tape or the like disposed at the lower side of the rotating plate 122. The mop-fixing member 122c may be a hook or the like disposed on the edge of the rotating plate 122.

The rotating plate 122 includes a slope 122d, which is disposed on the lower end of the spin shaft 128 so that the water inside a water supply space Sw moves downwards along the slope 122d due to the force of gravity. The slope 122d is formed along the periphery of the lower end of the spin shaft 128. The slope 122d is downwardly inclined in the centrifugal direction XO. The entire slope 122d may be formed in a truncated cone shape. The lower end of the spin shaft 128 is fixed to the upper center of the slope 122d.

A water supply hole 122a vertically penetrates the rotating plate 122. The water supply hole 122a connects the water supply space Sw to the lower side of the rotating plate 122. The water inside the water supply space Sw moves to the lower side of the rotating plate 122 through the water supply hole 122a. The water inside the water supply space Sw moves to the mop unit 121 through the water supply hole 122a. The water supply hole 122a is located in the center portion of the rotating plate 122. The water supply hole 122a is located so as to avoid the spin shaft 128.

The rotating plate 122 may be provided with a plurality of water supply holes 122a therein. A connecting portion 122b is disposed between the respective water supply holes 122a. The connecting portion 122b interconnects the portion of the rotating plate 122 in the centrifugal direction XO and the portion of the rotating plate 122 in the counter-centrifugal direction XI on the basis of the water supply hole 122a.

The plurality of water supply holes 122a may be spaced apart from each other in the peripheral direction of the spin shaft 128. The water supply holes 122a may be spaced apart from each other by a constant distance. Accordingly, when the rotating plate 122 rotates, water is supplied evenly to the mop unit 121 in all directions on the basis of the spin shaft 128.

The water supply holes 122a are disposed in the centrifugal direction XO in the lower end portion of the slope 122d. Accordingly, the water, which has moved downwards along the slope 122d due to the force of gravity and centrifugal force, may be introduced into the water supply holes 122a. The side surface of the water supply hole 122a in the counter-centrifugal direction XI may be aligned with the lower end portion of the slope 122d.

The side surface Qh of the water supply hole 122a in the centrifugal direction XO and the side surface Qw of the water supply reservoir 123 in the counter-centrifugal direction XI are provided so as to extend vertically. The side surface Qh of the water supply hole 122a in the centrifugal direction XO and the side surface Qw of the water supply reservoir 123 in the counter-centrifugal direction XI are disposed on substantially the same vertical line. Accordingly, the water, which is forced to move in the centrifugal direction XO by the centrifugal force, is finally introduced into the water supply hole 122a.

The side surface Qh of the water supply hole 122a in the centrifugal direction XO forms a cylindrically curved surface. The side surface Qw of the water supply reservoir 123 in the counter-centrifugal direction XI forms a cylindrically curved surface. Both the side surface Qh of the water supply hole 122a in the centrifugal direction XO and the side surface Qw of the water supply reservoir 123 in the counter-centrifugal direction XI form a cylindrically curved surface.

The first cleaning module 120 includes the mop unit 121, which is configured so as to be brought into contact with the floor. The mop unit 121 is coupled to the lower side of the rotating plate 122. The mop unit 121 is disposed on each of the bottom surface of the left spin mop 120a and the bottom surface of the right spin mop 120b. The mop unit 121 may be fixedly disposed on the rotating plate 122, or may be disposed in a manner such that it is replaceable. The mop unit 121 may be separably fixed to the rotating plate 122 via a piece of Velcro tape, a hook, or the like. The mop unit 121 may be configured as a mop alone, or may include a mop and a spacer (not shown). The mop serves to perform mopping in contact with the floor. The spacer may be disposed between the rotating plate 122 and the mop and may serve to adjust the position of the mop. The spacer may be separably fixed to the rotating plate 122, and the mop may be separably fixed to the spacer. Needless to say, the mop 121a may be separably fixed to the rotating plate 122 without the spacer.

Referring to FIGS. 8, 10, and 18 to 23, the first cleaning module 120 includes the spin shaft 128, which is configured to rotate the rotating plate 122. The spin shaft 128 is fixed to the rotating plate 122 and transmits the torque of the spin-drive unit 124 to the rotating plate 122. The spin shaft 128 is connected to the upper side of the rotating plate 122. The spin shaft 128 is disposed on the upper center of the rotating plate 122. The spin shaft 128 is fixed to the rotation center Osa or Osb of the rotating plate 122. The spin shaft 128 includes a gear-fixing portion 128a for fixing a gear 127b. The gear-fixing portion 128a is disposed on the upper end of the spin shaft 128.

The first cleaning module 120 includes a left spin shaft 128, fixed to the left rotating plate 122 to rotate the left rotating plate 122, and a right spin shaft 128, fixed to the right rotating plate 122 to rotate the right rotating plate 122.

The spin shaft 128 extends perpendicular to the rotating plate 122. The left spin shaft 128 is disposed perpendicular to the bottom surface of the left spin mop 120a, and the right spin shaft 128 is disposed perpendicular to the bottom surface of the right spin mop 120b. In an embodiment in which the bottom surface of the spin mop 120a or 120b is inclined relative to the horizontal plane, the spin shaft 128 is tilted relative to the vertical axis. The upper end of the spin shaft 128 is tilted to one side relative to the lower end. The upper end of the left spin shaft 128 is tilted leftward relative to the lower end. The upper end of the right spin shaft 128 is tilted rightward relative to the lower end.

The tilting angle of the spin shaft 128 relative to the vertical axis may be changed depending on the rotation of the tilting frame 125 about the tilting rotary shaft 126. The spin shaft 128 is rotatably coupled to the tilting frame 125 so as to be integrally tilted with the tilting frame 125. When the tilting frame 125 is tilted, the spin-drive unit 124, the driving transmission unit 127, the spin shaft 128, the rotating plate 122, the water supply reservoir 123, and the mop unit 121 are integrally tilted.

The first cleaning module 120 includes the water supply reservoir 123, which is disposed at the upper side of the rotating plate 122 so as to accommodate water therein. The water supply reservoir 123 defines the water supply space Sw in which water is accommodated. The water supply reservoir 123 surrounds the periphery of the spin shaft 128 and is spaced apart from the spin shaft 128 so as to define the water supply space Sw therebetween. The water supply reservoir 123 allows the water supplied to the upper side of the rotating plate 122 to be collected in the water supply space Sw until the water passes through the water supply hole 122a. The water supply space Sw is disposed at the upper side of the center portion of the rotating plate 122. The water supply space Sw has a cylindrical volume overall. The upper side of the water supply space Sw is open so that the water is introduced into the water supply space Sw through the upper side of the water supply space Sw.

The water supply reservoir 123 protrudes upwards from the rotating plate 122. The water supply reservoir 123 extends in the peripheral direction of the spin shaft 128. The water supply reservoir 123 may be formed by a ring-shaped rib. The water supply hole 122a is located in the inner lower surface of the water supply reservoir 123. The water supply reservoir 123 is spaced apart from the spin shaft 128.

The side surface Qw of the water supply reservoir 123 in the counter-centrifugal direction XI faces the outer peripheral surface of the spin shaft 128. The side surface Qw is spaced apart from the spin shaft 128. The side surface Qw is smoothly connected to the side surface Qh in the vertical direction. The lower end of the water supply reservoir 123 is fixed to the rotating plate 122. The water supply reservoir 123 has a free upper end.

The first cleaning module 120 includes the spin-drive unit 124, which provides drive force for rotating the spin mop 120a or 120b. The first cleaning module 120 includes a left spin-drive unit 124, which provides power required for rotating the left spin shaft 128, and a right spin-drive unit 124, which provides power required for rotating the right spin shaft 128. The left spin-drive unit 124 provides drive force required for rotating the left spin shaft 128. The right spin-drive unit 124 provides drive force required for rotating the right spin shaft 128.

The first cleaning module 120 includes the driving transmission unit 127, which transmits the torque of the spin-drive unit 124 to the spin shaft 128. The driving transmission unit 127 may include a plurality of gears and/or a belt, for example.

In the present embodiment, the driving transmission unit 127 includes a first gear 127a fixed to a rotating shaft of the spin-drive unit 124. The first gear 127a may be a worm gear. The driving transmission unit 127 may include a second gear 127b, which is engaged and rotated with the first gear 127a. The second gear 127b may be a spur gear. The second gear 127b is fixed to the spin shaft 128 so as to allow the spin shaft 128 to be rotated simultaneously with the rotation of the second gear 127b.

The first cleaning module 120 includes the tilting frame 125, which is disposed on the body 110 so as to be tiltable within a predetermined angular range. The inclination angle Ag1 or Ag2 of the tilting frame 125 may be changed depending on the state of the floor. The tilting frame 125 may perform a suspension function for the spin mop 120a or 120b (a function of supporting the weight and alleviating vertical vibration). The tilting frame 125 is tiltably supported by the base 13. The tilting frame 125 rotatably supports the spin shaft 128.

The first cleaning module 120 includes the left tilting frame 125, which supports the left spin shaft 128. The left tilting frame 125 is rotatable within a predetermined range about a left tilting rotary shaft 126.

The first cleaning module 120 includes the right tilting frame 125, which supports the right spin shaft 128. The right tilting frame 125 is rotatable within a predetermined range about a right tilting rotary shaft 126.

For example, when the left spin mop 120a is brought into contact with a recessed portion in the floor, the inclination angle Ag1 of the left spin mop 120a may be increased within a predetermined range by the left tilting frame 125. When the right spin mop 120b is brought into contact with a recessed portion in the floor, the inclination angle Ag2 of the right spin mop 120b may be increased within a predetermined range by the right tilting frame 125.

The tilting frame 125 includes a frame base 125a defining the bottom surface thereof. The spin shaft 128 is disposed so as to vertically penetrate the frame base 125a. The frame base 125a may be configured by a plate, which forms a vertical thickness. The tilting rotary shaft 126 rotatably interconnects the base 13 and the frame base 125a.

The cleaner 100 includes a water supply cabinet 125b, which is disposed at the upper side of the water supply reservoir 123. The tilting frame 125 may include the water supply cabinet 125b.

The water supply cabinet 125b may accommodate the spin shaft 128 therein. The water supply cabinet 125b may be disposed at the lower side of the body 110. The water supply cabinet 125b may cover the upper side of the water supply reservoir 123. When viewed from the upper side, the water supply cabinet 125b may cover the upper side of the water supply reservoir 123. The water supply cabinet 125b defines a space recessed upwards from the lower side of the body 110 so as to accommodate the upper end portion of the water supply reservoir 123. The water supply cabinet 125b is fixed to the frame base 125a. The water supply cabinet 125b defines the space recessed upwards from the bottom surface of the frame base 125a. The water is introduced into the space defined by the water supply cabinet 125b through a water feeder 125c. The water supply cabinet 125b may minimize scattering of water, and thus all the water may be introduced into the water supply reservoir 123.

The water supply cabinet 125b includes a spin-shaft support portion 125b1, which rotatably supports the spin shaft 128. A bearing B may be provided between the spin-shaft support portion 125b1 and the spin shaft 128. The bearing B may include a first bearing B1 disposed at the lower side, and a second bearing B2 disposed at the upper side.

The lower end portion of the spin-shaft support portion 125b1 is inserted into the water supply space Sw of the water supply reservoir 123. The inner peripheral surface of the spin-shaft support portion 125b1 supports the spin shaft 128. The outer peripheral surface of the spin-shaft support portion 125b1 faces the inner peripheral surface Qw of the water supply reservoir 123. Accordingly, the spin-shaft support portion 125b1 may stably support the spin shaft 128, and may guide water to be easily collected in the water supply space Sw.

The lower end portion of the spin-shaft support portion 125b1 is disposed between the spin shaft 128 and the inner peripheral surface Qw of the water supply reservoir 123. The outer peripheral surface of the lower end portion of the spin-shaft support portion 125b1 is spaced apart from the inner peripheral surface Qw of the water supply reservoir 123 so as to define the water supply space Sw therebetween.

The slope 122*d* is disposed on the lower end portion of the spin-shaft support portion 125*b*1.

The water supply cabinet 125*b* includes partitions 125*b*2 and 125*b*3, which protrude from the spin-shaft support portion 125*b*1. The partitions 125*b*2 and 125*b*3 cover the upper end portion of the water supply reservoir 123. The partitions 125*b*2 and 125*b*3 cover the upper end and the outer peripheral surface of the water supply reservoir 123. The partitions 125*b*2 and 125*b*3 are disposed in the centrifugal direction XO of the spin-shaft support portion 125*b*1. The partitions 125*b*2 and 125*b*3 are fixed to and supported by the frame base 125*a*. The partitions 125*b*2 and 125*b*3 support the spin-shaft support portion 125*b*1.

The partitions 125*b*2 and 125*b*3 include a first partition 125*b*2, which covers the upper end of the water supply reservoir 123. The first partition 125*b*2 protrudes from the spin-shaft support portion 125*b*1 in the centrifugal direction XO. The partitions 125*b*2 and 125*b*3 include a second partition 125*b*3, which covers the upper end portion of the outer peripheral surface of the water supply reservoir 123. The second partition 125*b*3 protrudes downwards from the first partition 125*b*2. The second partition 125*b*3 has a free lower end.

The cleaner 100 includes the water feeder 125*c*, which guides the water to move from the inside of the body 110 into the water supply reservoir 123. The tilting frame 125 may include the water feeder 125*c*, which receives water from the water supply module 150.

The water feeder 125*c* receives the water from a supply pipe 156. The water feeder 125*c* forms a water flow passage. The water feeder 125*c* guides the water to pass through the water supply cabinet 125*b* and to be introduced into the water supply reservoir 123. One end of the flow passage formed by the water feeder 125*c* is connected to the end of the supply pipe 156. The opposite end of the flow passage formed by the water feeder 125*c* is disposed in the water supply space Sw. One end of the flow passage formed by the water feeder 125*c* is disposed outside the water supply cabinet 125*b* (inside the body 110), and the opposite end thereof is disposed inside the water supply cabinet 125*b* (in the portion in which the water supply space Sw is disposed). The water feeder 125*c* is fixed to the tilting frame 125. The water feeder 125*c* is fixed to the water supply cabinet 125*b*.

The tilting frame 125 includes the first support portion 125*d*, which supports one end of the elastic member 129. The second support portion 13*b*, which is disposed at the base 13, supports the opposite end of the elastic member 129. The second support portion 13*b* may be formed at the support member 13*a* of the base 13. When the tilting frame 125 is tilted about the tilting rotary shaft 126, the position of the first support portion 125*d* is changed and the length of the elastic member 129 is changed.

The first support portion 125*d* is fixed to the tilting frame 125. The first support portion 125*d* is disposed on the right portion of the left tilting frame 125. The first support portion 125*d* is disposed on the left portion of the right tilting frame 125.

The second support portion 13*b* is fixed to the base 13. The second support portion 13*b* is disposed in the right area of the left spin mop module 120. The second support portion 13*b* is disposed in the left area of the right spin mop module 120.

The first support portion 125*d* is fixed to the tilting frame 125. When the tilting frame 125 is tilted, the first support portion 125*d* is also tilted with the tilting frame 125. The first support portion 125*d* protrudes away from the tilting rotary shaft 126 so that the portion to which one end portion of the elastic member 129 is fixed is spaced a predetermined distance apart from the tilting rotary shaft 126. In the state in which the inclination angle Ag1 or Ag2 is the minimum value, the distance between the first support portion 125*d* and the second support portion 13*b* is the greatest. In the state in which the inclination angle Ag1 or Ag2 is the maximum value, the distance between the first support portion 125*d* and the second support portion 13*b* is the shortest. The elastic member 129 is provided so as to undergo elastic tension stress as the inclination angle Ag1 or Ag2 is reduced to the minimum value.

Referring to FIG. 8, when the left tilting frame 125 rotates in the counterclockwise direction about the tilting rotary shaft 126 when viewed from the rear side, the second support portion 13*b* moves leftwards and the elastic member 129 is shortened and elastically restored. When the left tilting frame 125 rotates in the clockwise direction about the tilting rotary shaft 126 when viewed from the rear side, the second support portion 13*b* moves rightwards and the elastic member 129 is lengthened and elastically deformed. When the right tilting frame 125 rotates in the clockwise direction about the tilting rotary shaft 126 when viewed from the rear side, the second support portion 13*b* moves rightwards and the elastic member 129 is shortened and elastically restored. When the right tilting frame 125 rotates in the counterclockwise direction about the tilting rotary shaft 126 when viewed from the rear side, the second support portion 13*b* moves leftwards and the elastic member 129 is lengthened and elastically deformed.

The tilting frame 125 includes a motor support portion 125*e*, which supports the spin-drive unit 124. The motor support portion 125*e* may support the driving transmission unit 127.

The tilting frame 125 includes the upper-end-limit contact portion 125*f*, which is configured so as to be brought into contact with the upper-end limit 13*d*. The top surface of the upper-end-limit contact portion 125*f* may be brought into contact with the bottom surface of the upper-end limit 13*d*. The left upper-end-limit contact portion 125*f* may be disposed on the left end of the left tilting frame 125. The right upper-end-limit contact portion 125*f* may be disposed on the right end of the right tilting frame 125.

The first cleaning module 120 includes the tilting rotary shaft 126, which is a rotating shaft of the tilting frame 125. The tilting rotary shaft 126 extends in the direction perpendicular to the inclined direction of the spin mop 120*a* or 120*b*. The tilting rotary shaft 126 may extend in the horizontal direction. In the present embodiment, the tilting rotary shaft 126 extends in the forward-and-backward direction.

The first cleaning module 120 includes the left tilting rotary shaft 126, which extends in the direction perpendicular to the inclined direction of the bottom surface of the left spin mop 120*a*. The first cleaning module 120 includes the right tilting rotary shaft 126, which extends in the direction perpendicular to the inclined direction of the bottom surface of the right spin mop 120*b*.

The first cleaning module 120 includes the elastic member 129, which applies elastic force to the tilting frame 125. The elastic member 129 stretches when the tilting frame 125 is rotated downwards, and shrinks when the tilting frame 125 is rotated upwards. The elastic member 129 enables shock-absorbing (elastic) operation of the tilting frame 125. The elastic member 129 applies a moment to the tilting frame 125 so that the inclination angle Ag1 or Ag2 is increased.

The elastic member 129 may be disposed such that the entirety thereof extends a long length in the leftward-and-rightward direction.

Figure 12:
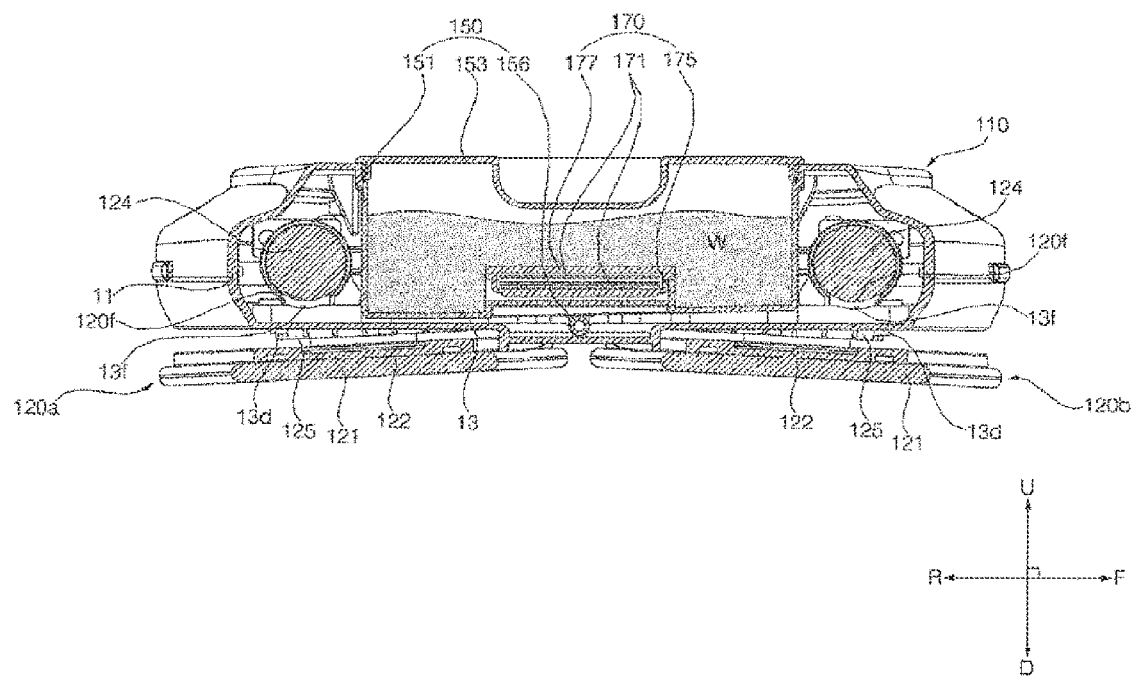
FIG. 12 is a vertical cross-sectional view of the cleaner 100 taken along line S5-S5' in FIG. 7.
Figure 13:
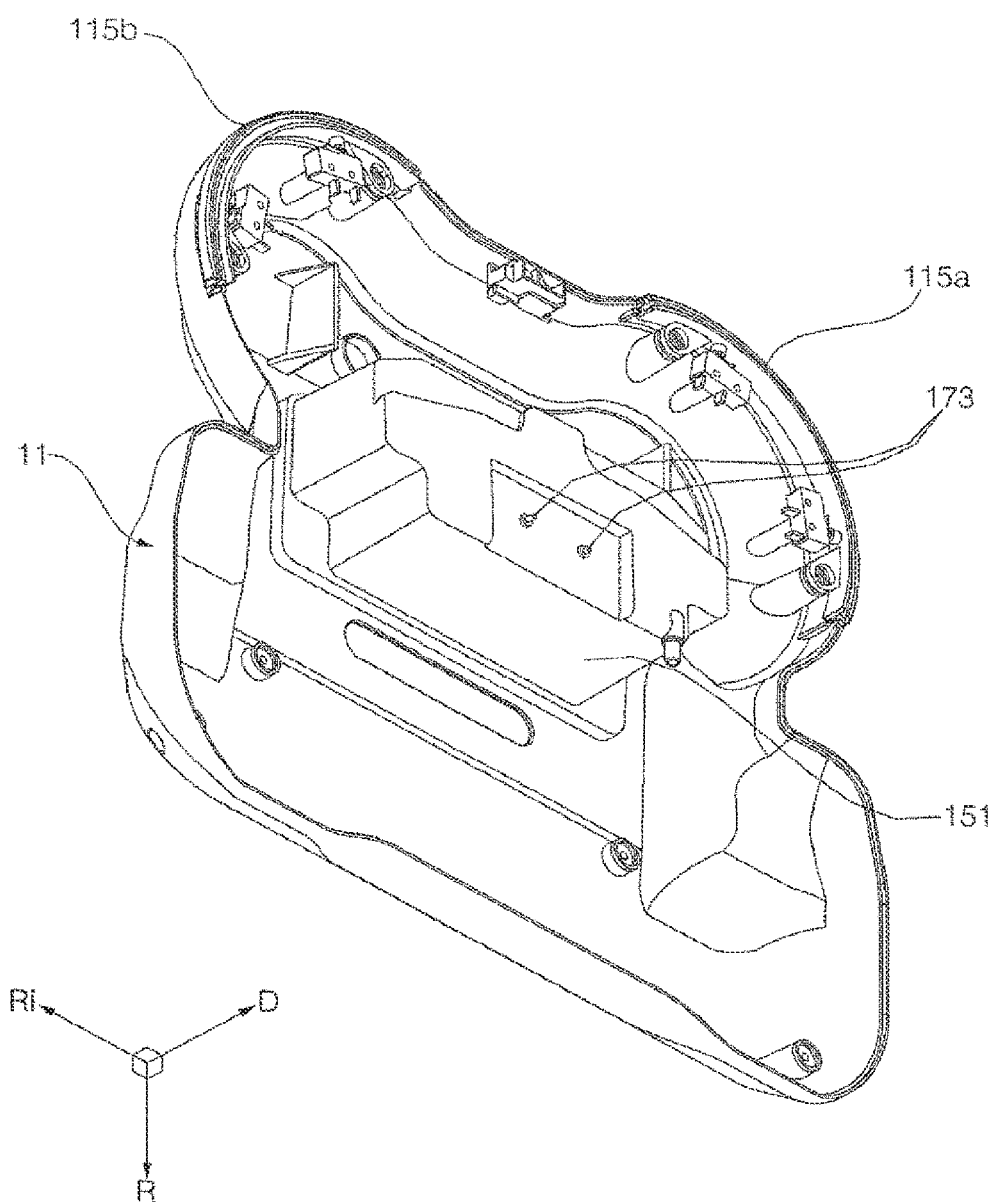
FIG. 13 is a perspective view illustrating the inner surface of a case 11 of the cleaner 100 in FIG. 1.
Figure 14:
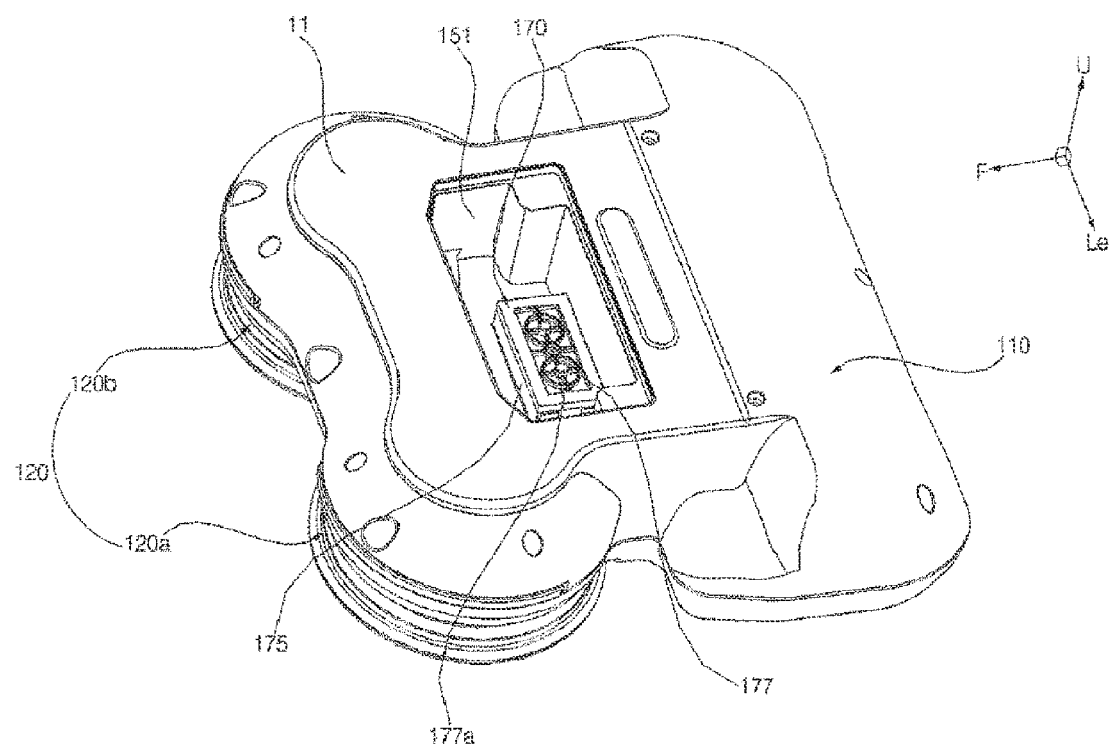
FIG. 14 is a perspective view illustrating the state in which a water tank opening/closing unit 153 is removed from the cleaner 100 in FIG. 1.
Figure 15A:
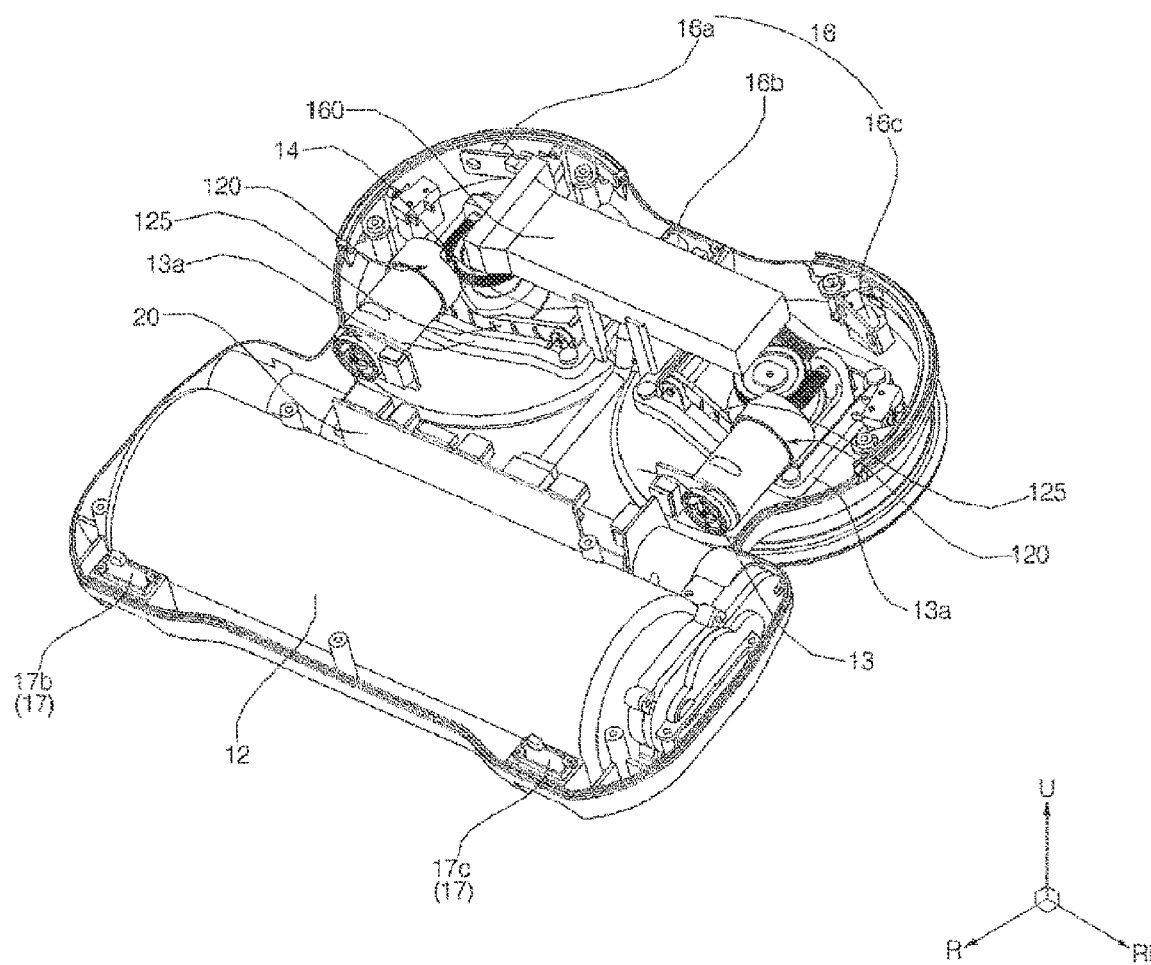
FIGS. 15A and 15B are perspective views illustrating the state in which the case 11 is removed from the cleaner 100 in FIG. 1.
Figure 15B:
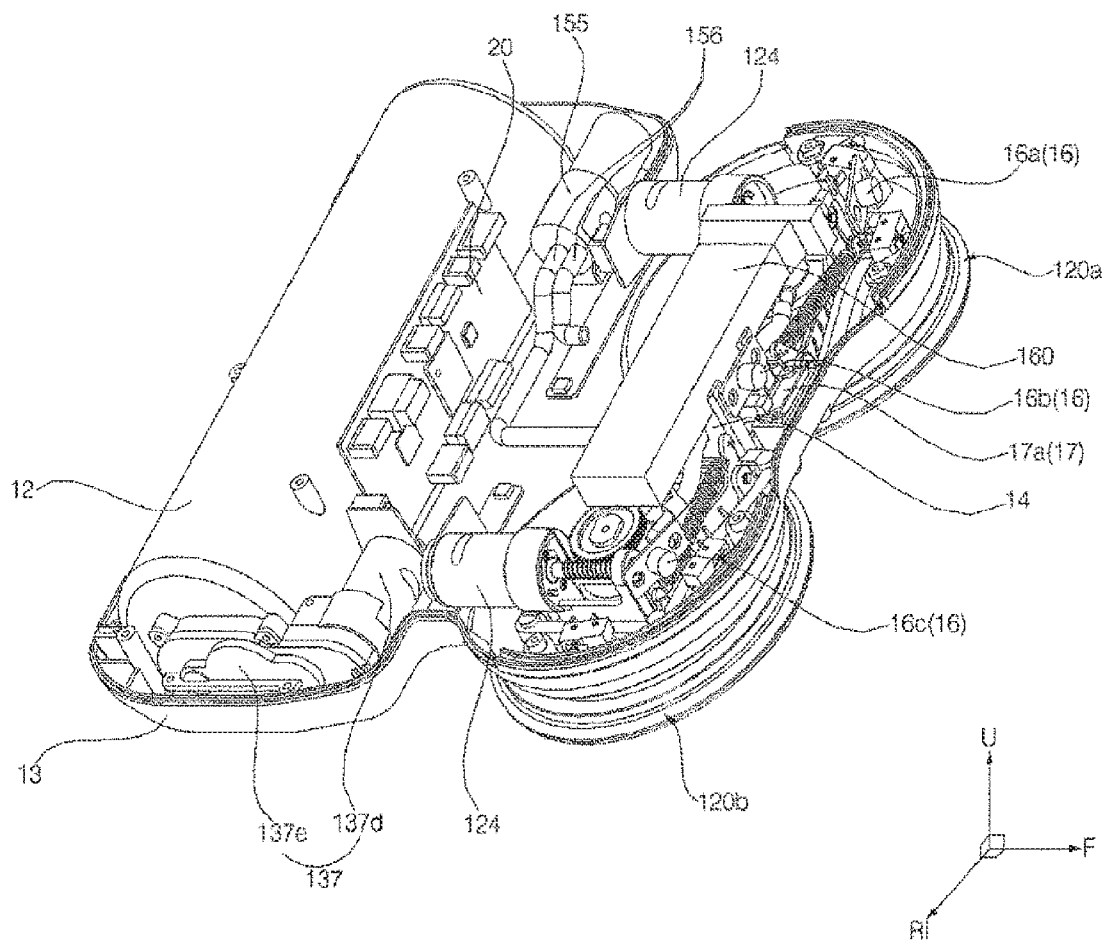
Figure 16A:
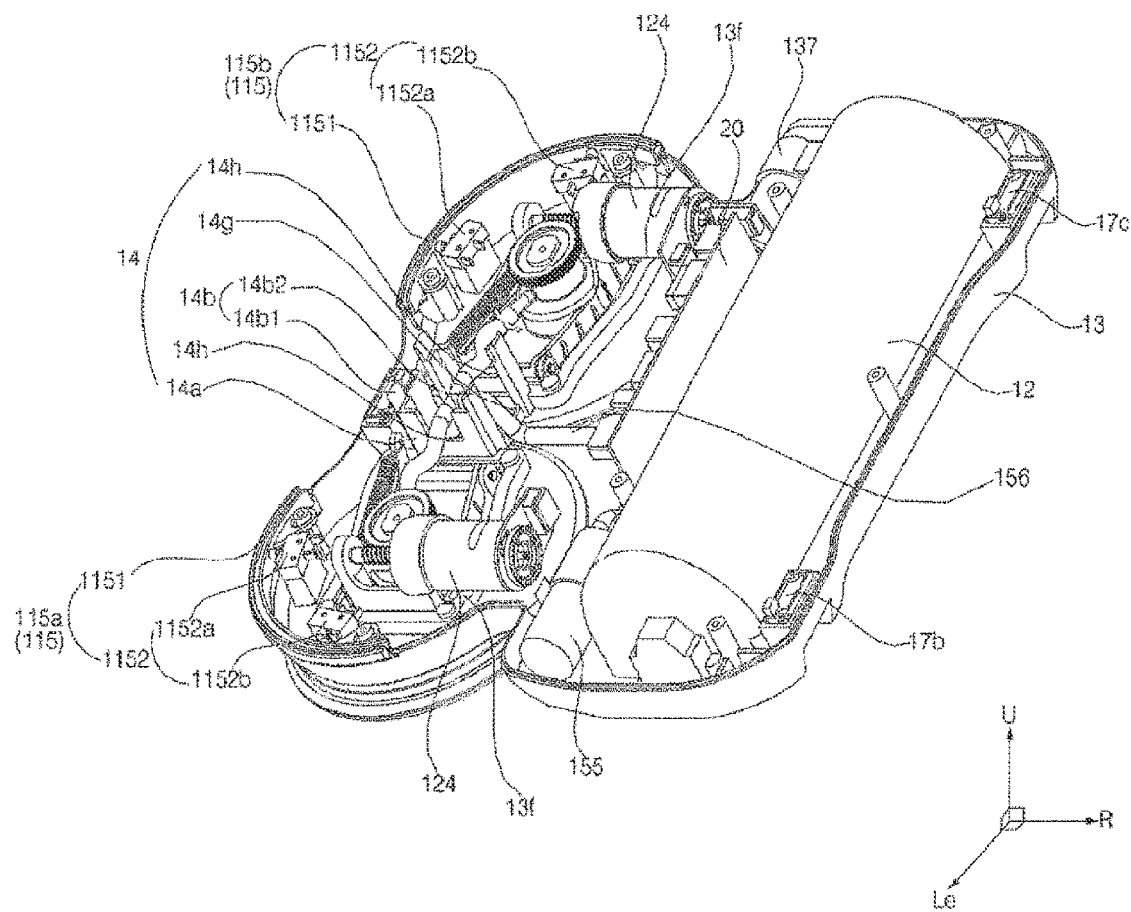
FIGS. 16A and 16B are perspective views illustrating the state in which a battery 160 is removed from the cleaner 100 in FIGS. 15A and 15B.
Figure 16B:
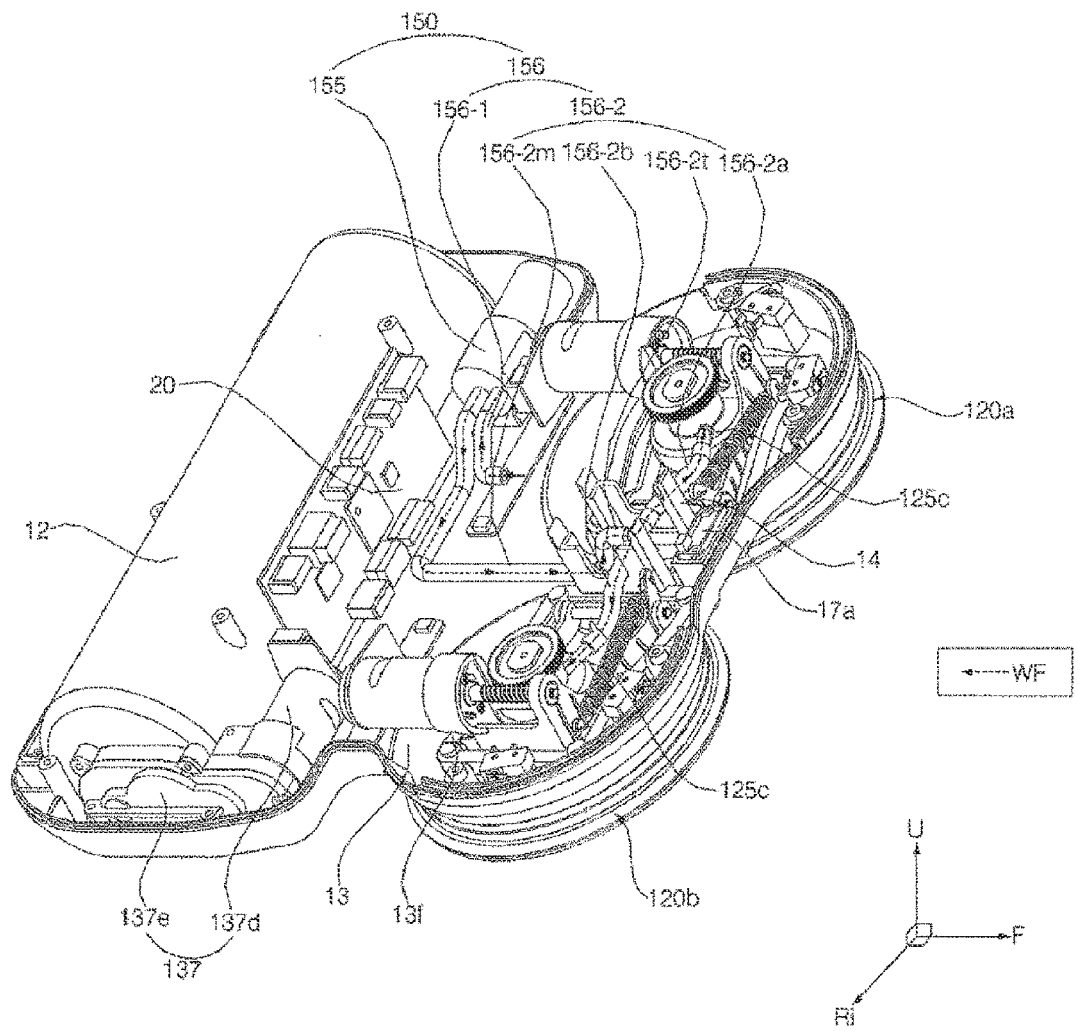

Referring to FIGS. 12, 16A and 16B, the first cleaning module 120 includes the lower-end-limit contact portion 120f, which is configured to be brought into contact with the lower-end limit 13f. The bottom surface of the lower-end-limit contact portion 120f may be brought into contact with the top surface of the lower-end limit 13f. The lower-end-limit contact portion 120f may be disposed on the lower portion of the spin-drive unit 124. The spin-drive unit 124 may be disposed so as to protrude horizontally from the tilting frame 125. The lower-end-limit contact portion 120f is disposed on the lower portion of the protruding portion of the spin-drive unit 124.

Referring to FIGS. 11, and 16A to 18, the water supply module 150 supplies water to the first cleaning module 120. In the drawings, the water W filling the water tank 151 and the water flow direction WF are illustrated. The water supply module 150 supplies water to the water supply space Sw. The water supply module 150 includes the water tank 151, which stores water therein. The water tank 151 is disposed inside the body 110. The water tank 151 is disposed at the upper side of the spin mops 120a and 120b.

In the present embodiment, the water supply module 150 includes a pump 155 for applying pressure to the water W inside the water tank 151 so as to move the water. The pump 155 may apply pressure to the water so as to move the water to the spin mop module 120. The pump 155 may apply pressure to the water W inside the water tank 151 so as to supply the water to the water supply space Sw.

Although not illustrated, in another embodiment, the water supply module may include a valve, and when the valve is opened, the water inside the water tank may move to the first cleaning module due to the weight thereof without the pump.

Although not illustrated, in a further embodiment, the water supply module may include a water-permeable cap. The water-permeable cap may be disposed in the supply pipe so that the water moves through the water-permeable cap. The water-permeable cap may be configured to reduce the flow rate of the water.

Hereinafter, a description will be made based on the present embodiment including the pump 155, but the invention is not necessarily limited thereto.

The water supply module 150 includes the supply pipe 156, which guides the movement of the water W from the water tank 151 to the first cleaning module 120. The supply pipe 156 interconnects the water tank 151 and the water feeder 125c to guide the movement of the water. The supply pipe 156 may flexibly bend according to the tilting of the tilting frame 125.

The supply pipe 156 includes a first supply pipe 156-1, which guides the movement of the water W from the water tank 151 to the pump 155, and a second supply pipe 156-2, which guides the movement of the water W from the pump 155 to the first cleaning module 120. One end of the first supply pipe 156-1 is connected to the lower portion of the water tank 151, and the opposite end thereof is connected to the pump 155. One end of the second supply pipe 156-2 is connected to the pump 155, and the opposite end thereof is connected to the water feeder 125c.

The second supply pipe 156-2 includes a common pipe 156-2m, which guides the movement of the water at an upstream side. One end of the common pipe 156-2m is connected to the pump 155, and the opposite end thereof is connected to a three-way connector 156-2t.

The second supply pipe 156-2 includes a first branch pipe 156-2a for guiding the movement of the water W to the left spin mop module 120, and a second branch pipe 156-2b for guiding the movement of the water W to the right spin mop module 120. The first branch pipe 156-2a guides some of the water inside the common pipe 156-2m to the left spin mop module 120. The second branch pipe 156-2b guides the remaining water inside the common pipe 156-2m to the right spin mop module 120. One end of the first branch pipe 156-2a is connected to the three-way connector 156-2t, and the opposite end thereof is connected to the water feeder 125c of the left spin mop module 120. One end of the second branch pipe 156-2b is connected to the three-way connector 156-2t and the opposite end thereof is connected to the water feeder 125c of the right spin mop module 120.

The second supply pipe 156-2 includes the three-way connector 156-2t, which connects the common pipe 156-2m, the first branch pipe 156-2a, and the second branch pipe 156-2b with each other. The three-way connector 156-2t forms a T-shaped flow passage overall. The three-way connector 156-2t includes a flow passage portion, which extends in the forward-and-backward direction and is connected to the common pipe 156-2m. The three-way connector 156-2t includes two branch flow-passage portions, which extend in two directions from the flow-passage portion connected to the common pipe 156-2m. The two branch flow-passage portions are respectively connected to the first branch pipe 156-2a and the second branch pipe 156-2b.

Figure 17:
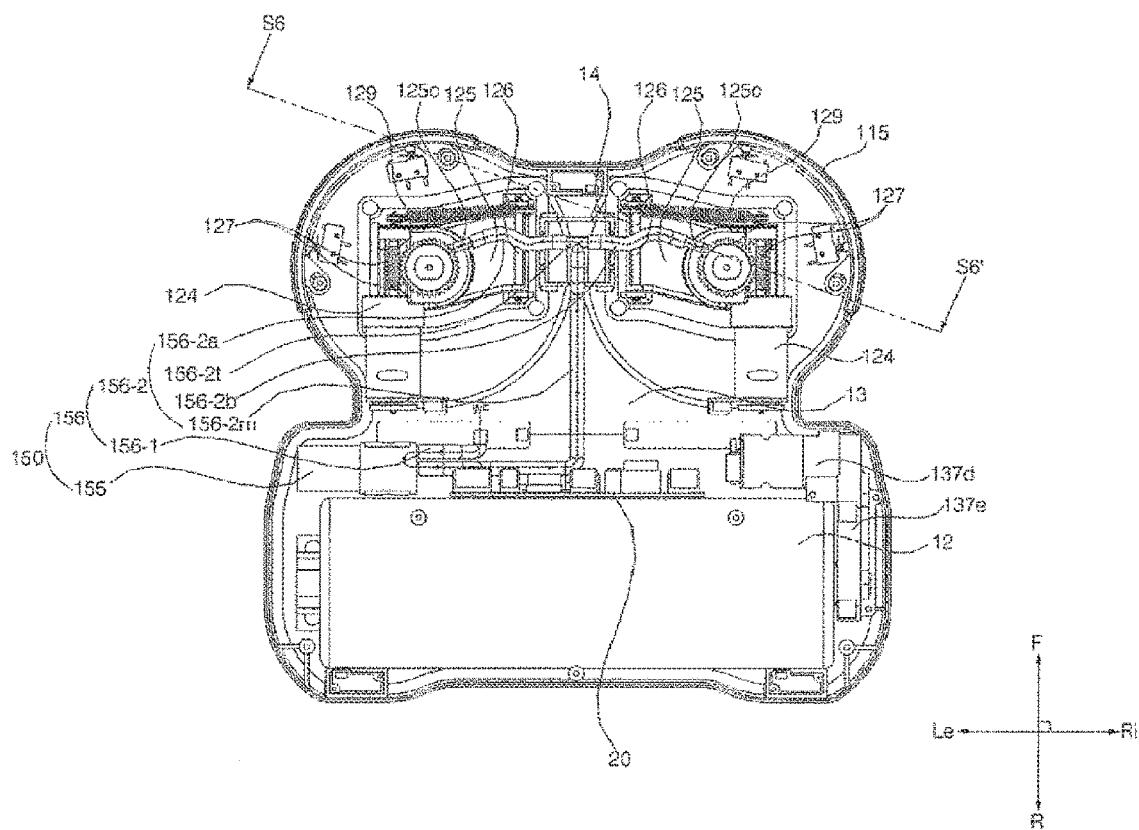
FIG. 17 is a top view of the cleaner 100 in FIGS. 16A and 16B.
Figure 18:
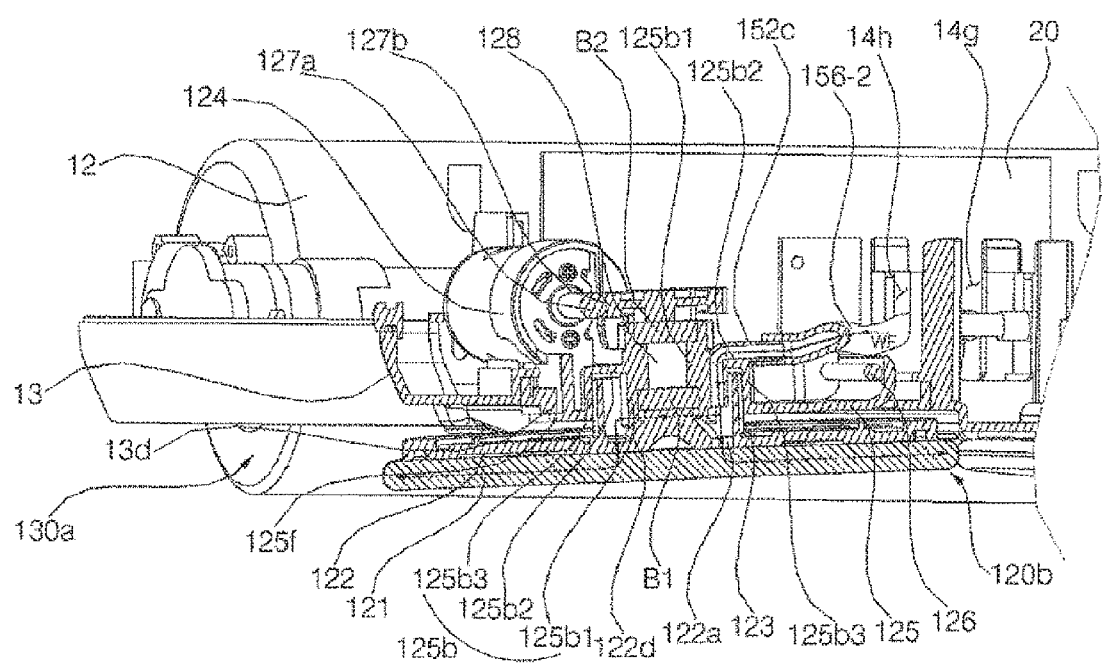
FIG. 18 is a vertical partial cross-sectional view of the cleaner 100 taken along line S6-S6' in FIG. 17.
Figure 19:
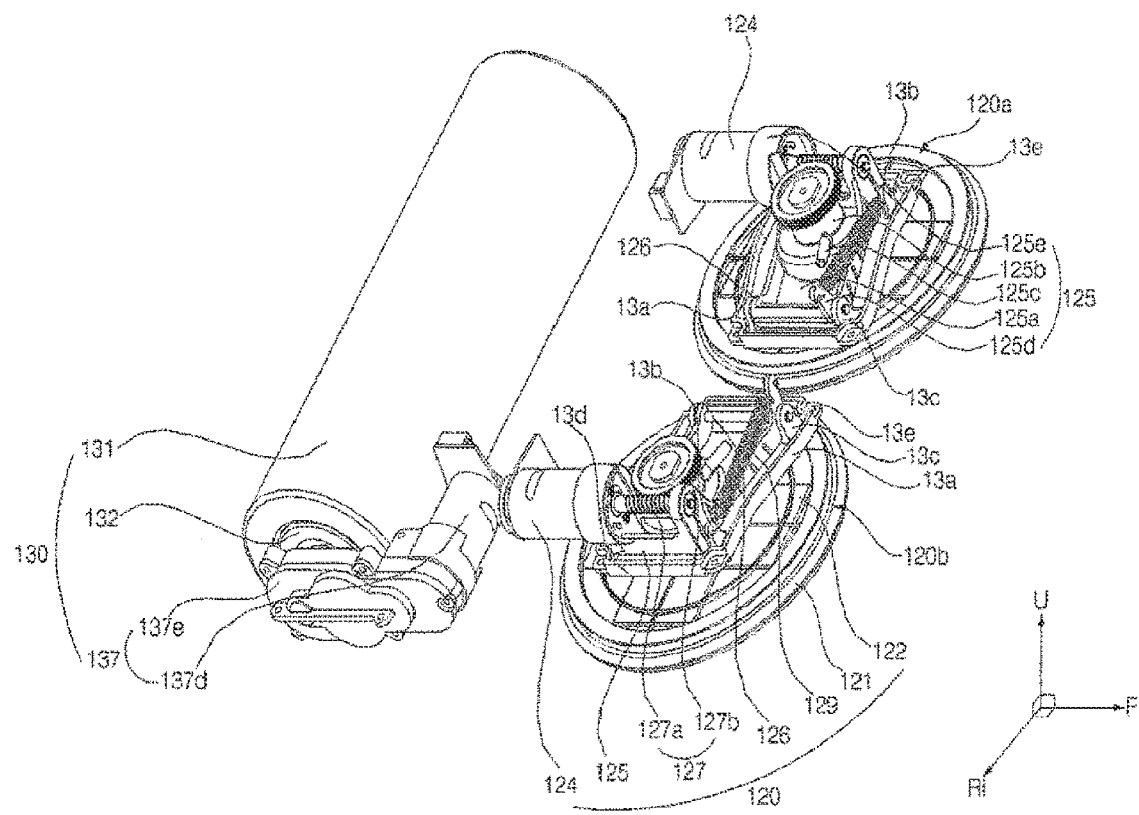
FIG. 19 is a perspective view of a first cleaning module 120 and a second cleaning module 130 of the cleaner 100 in FIG. 1.
Figure 20:
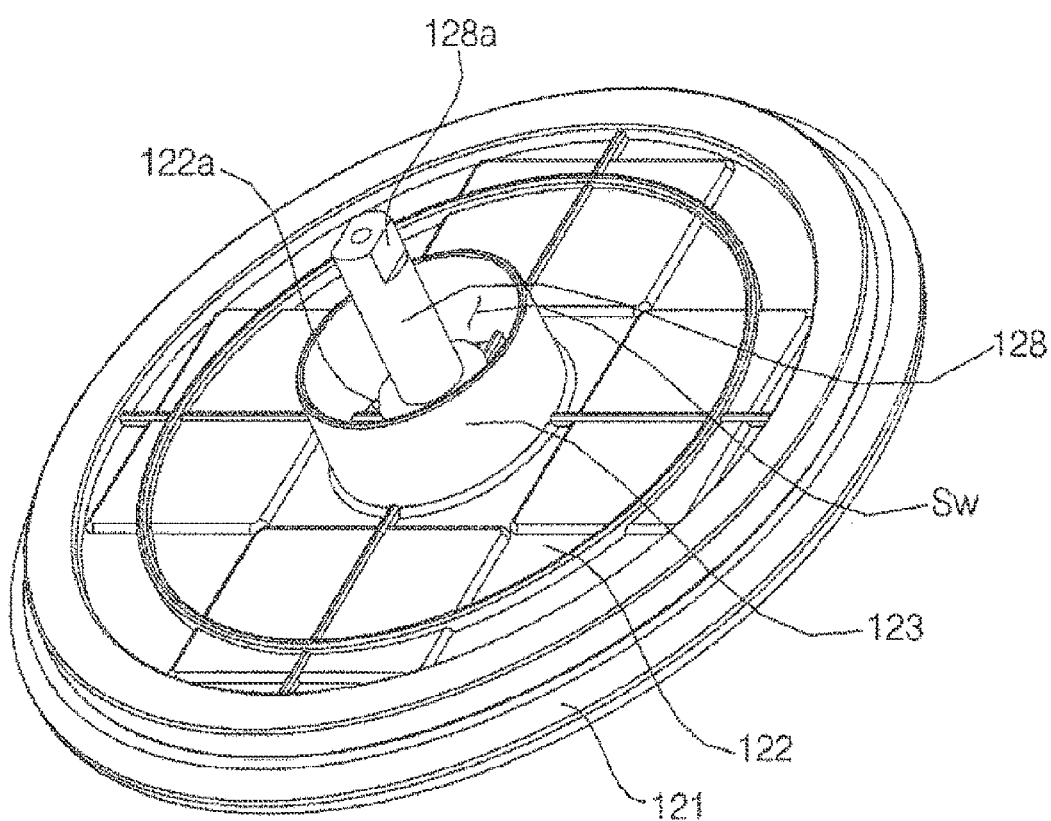
FIG. 20 is a perspective view of spin mops 120a and 120b in FIG. 19.
Figure 21:
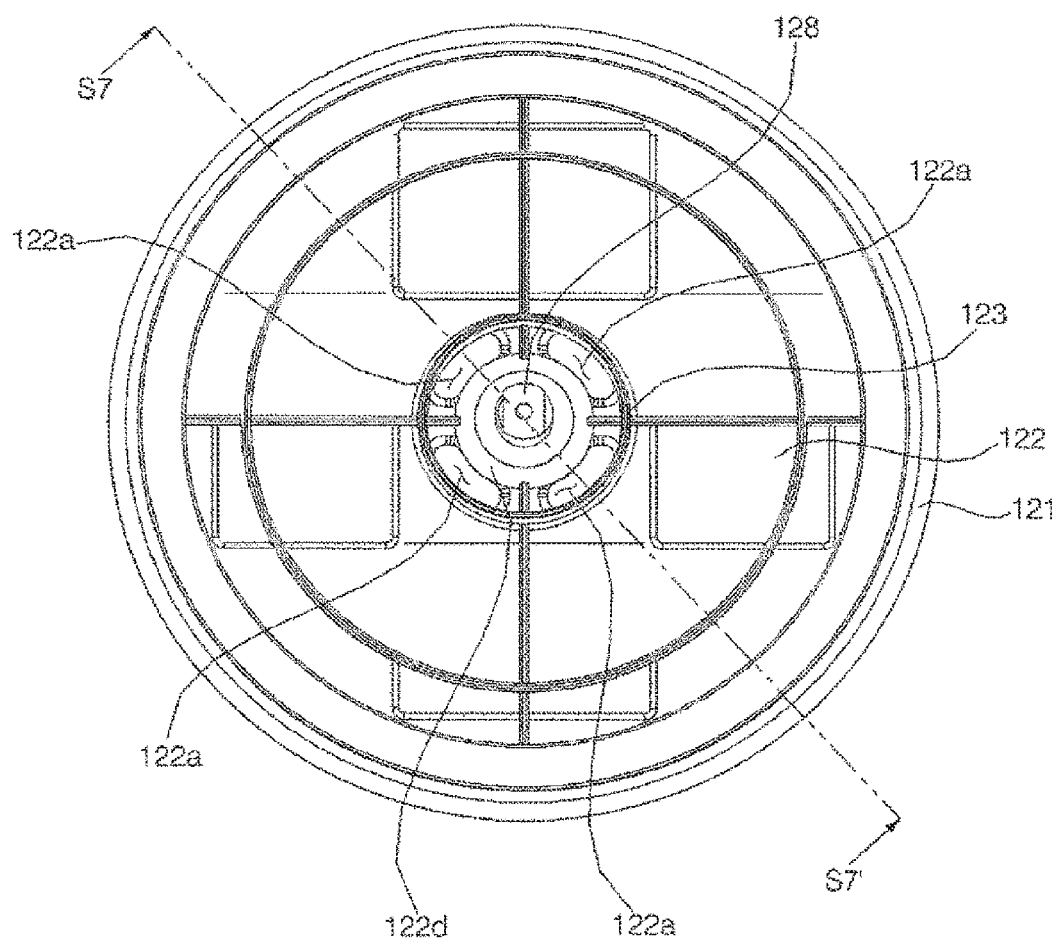
FIG. 21 is a top view of the spin mops 120a and 120b in FIG. 20.

A description related to the water flow direction WF will be made below with reference to FIGS. 11, 17 and 18. The pump 155 may be driven to cause movement of the water W. The water W inside the water tank 151 is introduced into the water feeder 125c via the supply pipe 156. The water W inside the water tank 151 sequentially passes through the first supply pipe 156-1 and the second supply pipe 156-2. The water W inside the water tank 151 sequentially passes through the common pipe 156-2m and the first branch pipe and is introduced into the water feeder 125c of the left spin mop module 120. The water W inside the water tank 151 sequentially passes through the common pipe 156-2m and the second branch pipe and is introduced into the water feeder 125c of the right spin mop module 120. The water introduced into the water feeder 125c passes through the tilting frame 125 and is introduced into the water supply reservoir 123. The water introduced into the water supply reservoir 123 passes through the water supply hole 122a and is introduced into the center portion of the mop unit 121. The water introduced into the center portion of the mop unit 121 moves to the edge of the mop unit 121 due to the centrifugal force generated by the rotation of the mop unit 121. The water remaining on the floor surface is mopped by the mop unit 131 of the second cleaning module 130, which follows the mop unit 121 at the rear side thereof.

Referring to FIGS. 15A to 18, the body 110 includes a battery support unit 14 for supporting the battery 160. The battery 160 is disposed on the upper side of the supply pipe by the battery support unit 14. The battery support unit 14 serves to guide the position of the supply pipe 156. The common pipe 156-2m, the first branch pipe 156-2a and the second branch pipe 156-2b are components in which water, which has a relatively high specific gravity, is accommodated. Therefore, it is desirable for the common pipe 156-2m, the first branch pipe 156-2a and the second branch pipe 156-2b to be arranged so as to be bilaterally symmetrical to each other in order to evenly distribute the weight that is applied to the left spin mop 120a and the right spin mop 120b. To this end, the battery support unit 14 guides the positions of the common pipe 156-2m, the first branch pipe 156-2a and the second branch pipe 156-2b.

The battery support unit 14 includes a supporter 14a disposed at the lower side of the battery 160. The supporter 14a supports the battery 160. The supporter 14a may be disposed between the left spin mop module 120 and the right spin mop module 120. The supporter 14a is disposed at the center portion of the body 110 in the leftward-and-rightward direction. The supporter 14a may be formed in a square column shape overall.

The battery support unit 14 includes a stopper 14b for restricting the horizontal movement of the battery 160. The stopper 14b includes a first stopper 14b1, which contacts the front surface of the battery 160, and a second stopper 14b2, which contacts the rear surface of the battery 160.

The battery support unit 14 has therein a main recess 14g, into which the common pipe 156-2m is inserted. The main recess 14g is formed in the supporter 14a. The main recess 14g is formed in the rear surface of the supporter 14a. The common pipe 156-2m is fixed in the main recess 14g, and the position of the common pipe 156-2m is therefore maintained.

The battery support unit 14 forms two branch recesses 14h, into which the first branch pipe 156-2a and the second branch pipe 156-2b are inserted. The two branch recesses 14h are formed in the supporter 14a. The two branch recesses 14h are respectively formed at portions of the supporter 14a that are located in the leftward-and-rightward direction. Because the first branch pipe 156-2a and the second branch pipe 156-2b are respectively fixed in the two branch recesses 14h, the positions of the first branch pipe 156-2a and the second branch pipe 156-2b are maintained.

The supporter 14a may guide the position of the three-way connector 156-2t. The three flow passage portions of the three-way connector 156-2t may be respectively inserted into the main recess 14g and the two branch recesses 14h.

Referring to FIGS. 11 to 14, the cleaner 100 may further include a sterilized-water-generating module 170. The sterilized-water-generating module 170 may be configured to generate sterilized water via electrolysis of water inside the water tank 151. For example, hypochlorous acid (HClO) sterilized water may be generated via electrolysis using a chlorine component contained in the tap water. The sterilized-water-generating module 170 may be disposed at the water tank 151.

The sterilized-water-generating module 170 includes a pair of electrodes 171, which are spaced apart from each other. One of the pair of electrodes 17 is a positive (+) electrode, and the other one is a negative (−) electrode. The electrolysis of water is performed and the sterilized water is generated by electric charges supplied from the pair of electrodes 171. The sterilized-water-generating module 170 includes a power connector 173, which receives electric energy of the battery 160. Power is supplied to the electrodes 171 through the power connector 173. The sterilized-water-generating module 170 includes a module case 175, which accommodates the electrodes 171 therein. The power connector 173 may be disposed at the bottom surface of the module case 175. The sterilized-water-generating module 170 includes a communication portion 177, in which an opening is formed so as to allow the sterilized water generated by the electrodes 171 to be introduced into the water tank 151 therethrough. The communication portion 177 is disposed at the upper side of the module case 175.

What is claimed is:
1. A cleaner comprising:
a body;
a left spin-mop module and a right spin-mop module configured to perform mopping and disposed below the body; and
a water supply module configured to supply water to the left spin-mop module and the right spin-mop module, the water supply module including:
a water tank configured to store the water therein and coupled to the body so as to form at least a portion of an external appearance of the body;
a pump disposed in the body and configured to pressurize the water to move the water to the left spin-mop module and the right spin-mop module;
a first supply pipe disposed in the body and connecting the water tank and the pump;
a common pipe disposed in the body and connected to the pump, the common pipe being configured to guide movement of the water from the pump;
a first branch pipe disposed in the body and configured to guide a first portion of the water in the common pipe to the left spin-mop module; and
a second branch pipe disposed in the body and configured to guide a second portion of the water in the common pipe to the right spin-mop module.

2. The cleaner of claim 1, wherein the water supply module further includes a three-way connector defining a T-shaped flow path, the three-way connector including:
a longitudinally extending flow-path portion connected to the common pipe;
a first branch flow-path portion extending from the longitudinally extending flow-path portion in a first direction; and
a second branch flow-path portion extending from the longitudinally extending flow-path portion in a second direction different from the first direction.

3. The cleaner of claim 2, wherein the first branch flow-path portion is connected to the first branch pipe and the second branch flow-path portion is connected to the second branch pipe.

4. The cleaner of claim 1, further comprising a water feeder configured to receive the water from the water supply module so as to supply the water to the left spin-mop module and the right spin-mop module, the water feeder overlapping an area of the left spin-mop module and the right spin-mop module in a vertical direction.

5. The cleaner of claim 4, wherein the water feeder includes:
a left water feeder connecting the left spin-mop module to the first branch pipe; and
a right water feeder connecting the right spin-mop module to the second branch pipe.

6. The cleaner of claim 4, wherein each of the left spin-mop module and the right spin-mop module includes:
a rotating plate provided at a lower side of the body;
a mop unit coupled to a lower side of the rotating plate so as to be contactable with a floor; and
a spin shaft at an upper side of the rotating plate.

7. The cleaner of claim 6, wherein the rotating plate includes a water supply hole through which the water from the water feeder is introduced into the mop unit, the water supply hole being spaced apart from the spin shaft in a radial direction.

8. The cleaner of claim 7, wherein the water feeder overlaps a rotational trajectory of the water supply hole.

9. The cleaner of claim 1, wherein the water tank is located above the left spin-mop module and the right spin-mop module.

10. The cleaner of claim 1, wherein the pump is located closer to any one of the left spin-mop module and the right spin-mop module than to the other of the left spin-mop module and the right spin-mop module.

11. The cleaner of claim 1, wherein each of the left spin-mop module and the right spin-mop module includes a spin shaft, and
wherein the pump is spaced apart from the spin shaft of the left spin-mop module and the spin shaft of the right spin-mop module in a front-rear direction of the body.

12. The cleaner of claim 1, wherein the first branch pipe and the second branch pipe are arranged to be symmetrical to each other.

13. The cleaner of claim 12, wherein the first branch pipe and the second branch pipe are bilaterally symmetrically disposed to equally distribute the water supplied to the left spin-mop module and the right spin-mop module.

14. The cleaner of claim 12, wherein the first branch pipe and the second branch pipe are of equal length.

15. The cleaner of claim 12, wherein the body includes a support unit configured to guide a position of the common pipe, the first branch pipe and the second branch pipe.

16. The cleaner of claim 15, wherein the water supply module further comprises a three-way connector to which the common pipe, the first branch pipe and the second branch pipe are coupled.

17. The cleaner of claim 16, wherein the three-way connector includes:
a first portion connected to the first branch pipe;
a second portion connected to the second branch pipe; and
a third portion connected to the common portion, and
wherein the first portion and the second portion are symmetrical with respect to the third portion.

18. The cleaner of claim 17, wherein the three-way connector is located so as to be supported by the support unit.

19. The cleaner of claim 18, wherein the support unit includes:
a first recess to support the first portion of the three-way connector; and
a second recess to support the second portion of the three-way connector.

20. The cleaner of claim 19, wherein the support unit includes a third recess to support the third portion of the three-way connector.

21. The cleaner of claim 12, wherein the body includes a printed circuit board spaced apart from the pump in a lateral direction of the body.

22. The cleaner of claim 21, further comprising:
a spin-drive unit configured to provide a force to rotate the left spin-mop module and the right spin-mop module; and
a driving transmission unit configured to transmit the force of the spin-drive unit to the left spin-mop module and the right spin-mop module,
wherein the pump is spaced in a rearward direction from the driving transmission unit.

23. The cleaner of claim 22, wherein the driving transmission unit includes:
a left driving transmission unit configured to transmit the force of the spin-drive unit to the left spin-mop module; and
a right driving transmission unit configured to transmit the force of the spin-drive unit to the right spin-mop module, and
wherein the pump is spaced in a rearward direction from the left driving transmission unit.

24. The cleaner of claim 1, wherein the first supply pipe is flexibly bendable.

25. A cleaner comprising:
a body;
a left spin-mop module and a right spin-mop module configured to perform mopping, each of the left spin-mop module and the right spin-mop module including:
a rotating plate provided at a lower side of the body;
a mop unit coupled to a lower side of the rotating plate so as to be contactable with a floor; and
a spin shaft at an upper side of the rotating plate;
a water supply module configured to supply water to the left spin-mop module and the right spin-mop module, the water supply module including:
a water tank configured to store the water therein and coupled to the body so as to form at least a portion of an external appearance of the body;
a pump disposed in the body and configured to pressurize the water to move the water to the left spin-mop module and the right spin-mop module;
a first supply pipe disposed in the body and connecting the water tank and the pump;
a common pipe disposed in the body and connected to the pump, the common pipe being configured to guide movement of the water from the pump;
a first branch pipe disposed in the body and configured to guide a first portion of the water in the common pipe to the left spin-mop module; and
a second branch pipe disposed in the body and configured to guide a second portion of the water in the common pipe to the right spin-mop module;
a spin-drive unit disposed in the body and configured to provide a force to rotate the left spin-mop module and the right spin-mop module; and
a driving transmission unit disposed in the body and configured to transmit the force of the spin-drive unit to the left spin-mop module and the right spin-mop module.

26. The cleaner of claim 25, wherein the driving transmission unit includes:
a left driving transmission unit configured to transmit the force of the spin-drive unit to the left spin-mop module; and
a right driving transmission unit configured to transmit the force of the spin-drive unit to the right spin-mop module.

27. The cleaner of claim 25, wherein the body includes a support unit configured to guide a position of the common pipe, the first branch pipe and the second branch pipe.

28. The cleaner of claim 27, wherein the water supply module further comprises a three-way connector to which the common pipe, the first branch pipe and the second branch pipe are coupled,
wherein the three-way connector includes:
a first portion connected to the first branch pipe;
a second portion connected to the second branch pipe; and
a third portion connected to the common portion,
wherein the first portion and the second portion are symmetrical with respect to the third portion, and
wherein the support unit includes:
a first recess to support the first portion of the three-way connector; and
a second recess to support the second portion of the three-way connector.

* * * * *